(12) United States Patent
Ge et al.

(10) Patent No.: US 12,418,332 B2
(45) Date of Patent: Sep. 16, 2025

(54) METHOD, APPARATUS, AND SYSTEM FOR MEASURING A MIMO CHANNEL

(71) Applicant: HUAWEI TECHNOLOGIES CO., LTD., Guangdong (CN)

(72) Inventors: Yiqun Ge, Kanata (CA); Wuxian Shi, Guangdong (CN); Wen Tong, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 164 days.

(21) Appl. No.: 18/482,874

(22) Filed: Oct. 7, 2023

(65) Prior Publication Data
US 2024/0039603 A1 Feb. 1, 2024

Related U.S. Application Data

(63) Continuation of application No. PCT/CN2021/090776, filed on Apr. 28, 2021.

(51) Int. Cl.
*H04L 1/02* (2006.01)
*H04B 7/0426* (2017.01)
*H04B 7/0456* (2017.01)
*H04B 7/06* (2006.01)

(52) U.S. Cl.
CPC ........... *H04B 7/063* (2013.01); *H04B 7/0434* (2013.01); *H04B 7/0486* (2013.01)

(58) Field of Classification Search
CPC .. H04B 7/0617; H04B 17/318; H04B 5/0048; H04B 7/0854; H04B 7/0486; H04L 5/0073; H04L 5/0026; H04L 27/2601; H04L 1/06; H04W 72/0413; H04W 72/082; H04W 16/28

USPC .......................................... 375/262, 260, 267
See application file for complete search history.

(56) References Cited

U.S. PATENT DOCUMENTS

2014/0198866 A1* 7/2014 Miyata ................. H04B 7/0689
375/260
2014/0307815 A1* 10/2014 Alex .................... H04B 7/0684
375/267
2015/0065153 A1* 3/2015 Nissila ................ H04L 25/0226
455/450

(Continued)

FOREIGN PATENT DOCUMENTS

CN 104303442 A 1/2015
WO 2020115523 A1 6/2020

OTHER PUBLICATIONS

Azimuth Systems Inc., et al. "Metrics for comparing reduced complexity models for millimeter-wave OTA demodulator testing". 3GPP TSG RAN WG4 #84, Berlin, Germany, Aug. 21-25, 2017. 5 pages.

*Primary Examiner* — Khai Tran

(57) ABSTRACT

According to the present disclosure, there are provided methods and devices for estimating a high-dimensional MIMO channel by expressing the MIMO channel in the form of a flow function to determine a change from an input state to an output state. This may be considered similar to a manner in which fluid dynamic problems are solved. Instead of using linearization to estimate all of the coefficients of a matrix representing a MIMO channel, a receiver may determine the MIMO channel rank by detecting leading modes in a subspace of the entire MIMO channel matrix.

20 Claims, 18 Drawing Sheets

(56) References Cited

U.S. PATENT DOCUMENTS

| | | | |
|---|---|---|---|
| 2015/0358104 A1* | 12/2015 | Ohwatari | H04J 11/005 370/252 |
| 2015/0381249 A1 | 12/2015 | Zhang et al. | |
| 2018/0115444 A1 | 4/2018 | Lee et al. | |
| 2019/0312623 A1 | 10/2019 | Park et al. | |

* cited by examiner $$Y = H \cdot X + N$$

SVD $$Y = (U \cdot \Sigma \cdot V^H) \cdot X$$

METHOD, APPARATUS, AND SYSTEM FOR MEASURING A MIMO CHANNEL

CROSS-REFERENCE TO RELATED APPLICATION

This application is related to, and is a continuation of, International Application No. PCT/CN2021/090776, filed on Apr. 28, 2021, and entitled "METHOD, APPARATUS, AND SYSTEM FOR MEASURING A MIMO CHANNEL", the entire contents of which are incorporated herein by reference.

TECHNICAL FIELD

The present disclosure relates generally to wireless communications, and in particular embodiments, a method for measuring a multiple input multiple output (MIMO) channel of a communication system.

BACKGROUND

In some wireless communication systems, user equipments (UEs) wirelessly communicate with a base station (for example, NodeB, evolved NodeB or gNB) to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

In current wireless systems, a radio channel between a transmitter and a receiver can be a hostile environment for communications. Transmission in the radio channel can experience fading in a time-varying manner. The fading may be probabilistic. Conventionally, channels are estimated and the estimates tracked over time. In order to perform channel estimation, the transmitter transmits reference signals, which can be referred to as pilots or demodulation reference signals (DMRSs), which are known to the receiver. The receiver can then estimate the channel based on the received reference signals and the known reference signals. In a MIMO system, the transmitter and receiver each have more than one antenna or antenna port resulting in multiple physical channels at each receiver antenna or antenna port, i.e. a physical channel from each transmitter antenna (port) to each receiver antenna (port). As part of a MIMO channel measurement process, after the receiver estimates the MIMO channels, the receiver feeds back the resulting MIMO channel measurements to the transmitter. The transmitter may then use the feedback information to compensate for effects of the channel i.e. cancel out useless signals for one receiver antenna (port) while concentrating useful signals for that antenna (port). Such channel measurement and feedback should be continuously performed to be able to aid in compensating the time varying effect of the channel.

As the number of channels increases between the transmitter and receiver to provide higher capacity between the transmitter and receiver, the channel estimation process can become more computationally complex and may need additional radio resources for transmission of reference signals used for channel estimation and feedback. Methods for reducing the complexity of the channel estimation and reducing radio resource overhead would be beneficial.

SUMMARY

Aspects of the disclosure include methods for determining rank of a channel between a transmitter having N transmit antennas and receiver having M receive antennas. Methods disclosed herein, and devices for implementing those methods, may reduce the complexity involved in determining the rank of the channel, especially as the number of antennas at the transmitter and/or receiver increase. Some embodiments include using a method for determining the rank that involves expressing the channel between the N transmit antennas at the transmitter and the M receive antennas at the transmitter as a flow function between an input state and output state. Such analysis may be similar to that found in a fluid dynamics problem. Performing the rank determination in such a manner may reduce the calculation complexity thereby improving performance of the transmitter and/or receiver, particularly with regard to power consumption.

According to an aspect of the disclosure there is provided a method. A receiver receives reference signals on each of L respective time intervals to generate reference signal vectors, each reference signal vector including M elements, where each of the M elements of a reference signal vector is a set of reference signals received from N transmit antennas of a transmitter on a respective receive antenna of M receive antennas of the receiver, and where M, N and L are integer values. The receiver may augment each reference signal vector of M elements to be a reference signal vector including N elements by adding N-M zero valued elements to the reference signal vector of M elements, such that the combination of the L augmented reference signal vectors of N elements is considered a N×L reference signal matrix. Then the receiver may reduce the dimension of the N×L reference signal matrix to an L×L reference signal matrix. The receiver determines a rank of the L×L reference signal matrix. This process of augmenting each reference signal vector of M elements to be a reference signal vector including N elements and then reducing the dimension of the N×L reference signal matrix to an L×L reference signal matrix may be more generally described as generating an L×L reference signal matrix from the N×L reference signal matrix, the N×L reference signal matrix including an augmented an M×L matrix.

In some embodiments, the determining the rank of the L×L reference signal matrix involves determining a number of leading eigenvalues in the L×L reference signal matrix that have a value that is larger than a threshold value, the number of leading eigenvalues larger than the threshold value corresponding to a rank of a multiple input multiple output (MIMO) channel between the N transmit antennas and M receive antennas.

In some embodiments, the receiver may determines one or more of a rank indicator (RI), a pre-coding matrix indicator (PMI), a channel quality indicator (CQI) or other MIMO-channel related measurements based on the determined number of leading eigenvalues and their eigenvectors, and transmits first configuration or measurement information that includes at least one of the RI, PMI, or CQI.

In some embodiments, the reference signal vector of M elements is expressed as $Y_{M \times 1}{}^t = F(X_{N \times 1}{}^t)$, $t=1, 2, 3, \ldots, L$ where $X_{N \times 1}{}^t$ are the reference signals from the N transmit antennas in the form of a N×1 vector at time interval t, $Y_{M\times1}^t$ are the reference signals received by the M receive antennas in the form of a M×1 complex vector at the time interval t, and function F(•) is a representation of the MIMO channel within the L transmission interval window.

In some embodiments, the augmenting each reference signal vector of N elements is expressed as $$X''_{N\times1} = \begin{bmatrix} Y^t_{M\times1} \\ 0_{(N-M)\times1} \end{bmatrix} t = 1, 2, 3, \ldots, L.$$

In some embodiments, the reducing the dimension of the N×L reference signal matrix to an L×L reference signal matrix involves projecting the M×L reference signal received matrix into a subspace $\tilde{H}=(U)^H\cdot X'\cdot V$, which is an L×L reduced dimension matrix of a full-matrix H representing the channel between the N transmit antennas and the M receive antennas, where X' is the received and augmented N×L reference signal matrix, V is a transmitter side precoding matrix and U is a receiver matrix, and the values of V and U are known.

In some embodiments, the method further involves: receiving second configuration information that includes information pertaining to at least one of: a maximum value of L; when a first reference signal vector is to be transmitted; or an indication of the transmitter side precoding matrix $V_{L\times L}$ and the receiver matrix $U_{N\times L}$.

According to an aspect of the disclosure there is provided an apparatus including a processor and a computer-readable media having stored thereon computer executable instructions. The computer executable instructions, when executed, cause the apparatus to: receive reference signals on each of L respective time intervals to generate reference signal vectors, each reference signal vector including M elements, where each of the M elements of a reference signal vector is a set of reference signals received from N transmit antennas of a transmitter on a respective receive antenna of M receive antennas of a receiver, and where M, N and L are integer values. The apparatus may augment each reference signal vector of M elements to be a reference signal vector including N elements by adding N-M zero valued elements to the reference signal vector of M elements, such that the combination of the L augmented reference signal vectors of N elements is considered a N×L reference signal matrix. The apparatus may reduce the dimension of the N×L reference signal matrix to an L×L reference signal matrix. The apparatus determines a rank of the L×L reference signal matrix.

In some embodiments, the computer executable instructions that when executed cause the apparatus to determine the rank of the L×L reference signal matrix cause the apparatus to determine a number of leading eigenvalues in the L×L reference signal matrix that have a value that is larger than a threshold value, the number of leading eigenvalues larger than the threshold value corresponding to a rank of a multiple input multiple output (MIMO) channel between the N transmit antennas and M receive antennas.

In some embodiments, the computer executable instructions may further cause the apparatus to: determine one or more of a rank indicator (RI), a pre-coding matrix indicator (PMI), a channel quality indicator (CQI) or other MIMO-channel related measurements based on the determined number of leading eigen values and their eigen-vectors; and transmit configuration information or measurement information that includes at least one of the RI, PMI or CQI.

In some embodiments, the reference signal vector of M elements is expressed as $Y_{M\times1}^t=F(X_{N\times1}^t)$, t=1, 2, 3, ..., L where $X_{N\times1}^t$ are the reference signals from the N transmit antennas in the form of a N×1 vector at time interval t, $Y_{M\times1}^t$ are the reference signals received by the M receive antennas in the form of a M×1 complex vector at the time interval t, and function F(•) is a representation of the MIMO channel within the L transmission interval window.

In some embodiments, the augmented reference signal vectors of N elements is $$X''_{N\times1} = \begin{bmatrix} Y^t_{M\times1} \\ 0_{(N-M)\times1} \end{bmatrix} t = 1, 2, 3, \ldots, L.$$

In some embodiments, the computer executable instructions reducing the dimension of the N×L reference signal matrix to an L×L reference signal matrix include computer executable instructions to: project the M×L reference signal received matrix into a subspace $\tilde{H}=(U)^H\cdot X'\cdot V$, which is an L×L reduced dimension matrix of a full-matrix H, which is a matrix representing the channel between the N transmit antennas and the M receive antennas where X' is the received and augmented N×L reference signal matrix, V is a transmitter side precoding matrix and U is a receiver matrix, and the values of V and U are known.

In some embodiments, the computer executable instructions further cause the apparatus to: receive second configuration information that includes information pertaining to at least one of: a maximum value of L; when a first reference signal vector is to be transmitted; or an indication of the transmitter side precoding matrix $V_{L\times L}$ and the receiver matrix $U_{N\times L}$.

According to an aspect of the disclosure there is provided a method. A transmitter transmits reference signals on each of L respective time intervals to a receiver (e.g., a UE) to generate reference signal vectors, each reference signal vector including M elements, where each of the M elements of a reference signal vector is a set of reference signals received on a respective receive antenna of M receive antennas of the receiver from N transmit antennas of the transmitter, and where M, N and L are integer values. The transmitter further receives configuration information associated with a rank of an L×L reference signal matrix, wherein the L×L reference signal matrix is generated from a N×L reference signal matrix, wherein the N×L reference signal matrix comprises L augmented reference signal vectors and each of the L augmented reference signal vectors comprising N elements, the N elements being generated by adding N-M zero valued elements to the reference signal vector of M elements, wherein a dimension of the L×L reference signal matrix is less than a dimension of the N×L reference signal matrix.

In some embodiments, the configuration information includes at least one of a rank indicator (RI), a pre-coding matrix indicator (PMI), a channel quality indicator (CQI), or other MIMO-channel related measurements, the first configuration information based upon a rank of a multiple input multiple output (MIMO) channel between the N transmit antennas and M receive antennas.

In some embodiments, the method further involves: transmitting data to the receiver based on the received configuration information.

In some embodiments, the reference signal vectors over the L time intervals are expressed as a reference signal $X_{N\times L}$, where $X_{N\times L}=U_{N\times L}\cdot\Sigma_{L\times L}\cdot(V_{L\times L})^H$ where the reference signal vectors are the reference signals from the N transmit antennas in the form of a N×1 complex vector at each of the L time intervals, $V_{L\times L}$ is a transmitter side precoding matrix, $U_{N\times L}$ is a is a receiver matrix, and $\Sigma_{L\times L}=I_{L\times L}$.

In some embodiments, the L×L reference signal matrix is generated by projecting the N×L reference signal received matrix into a subspace $\tilde{H}=(U)^H \cdot X' \cdot V$, which is an L×L reduced dimension matrix of a full-matrix H representing the channel between the N transmit antennas and the M receive antennas, where X' is the received and augmented N×L reference signal matrix, V is a transmitter side precoding matrix and U is a receiver matrix.

In some embodiments, the method further involves transmitting information pertaining to at least one of: a maximum value of L; when a first reference signal vector is to be transmitted; or an indication of the transmitter side precoding matrix $V_{L\times L}$ and the receiver matrix $U_{N\times L}$.

According to an aspect of the disclosure there is provided an apparatus including a processor and a computer-readable media having stored thereon computer executable instructions. The computer executable instructions, when executed, cause the apparatus to: transmit reference signals on each of L respective time intervals to a receiver to generate reference signal vectors, and receive configuration information from the receiver. Each of the M elements of a reference signal vector is a set of reference signals received from N transmit antennas on a respective receive antenna of M receive antennas of the receiver, and where M, N and L are integer values. The configuration information is based upon a rank of a L×L reference signal matrix, wherein the L×L reference signal matrix is generated from a N×L reference signal matrix, wherein the N×L reference signal matrix comprises L augmented reference signal vectors and each of the L augmented reference signal vectors comprising N elements, the N elements being generated by adding N-M zero valued elements to the reference signal vector of M elements, wherein a dimension of the L×L reference signal matrix is less than a dimension of the N×L reference signal matrix.

In some embodiments, the first configuration information including at least one of a rank indicator (RI), a pre-coding matrix indicator (PMI), a channel quality indicator (CQI), or other MIMO-channel related measurements, the first configuration information based upon a rank of a multiple input multiple output (MIMO) channel between the N transmit antennas and M receive antennas.

In some embodiments, the computer executable instructions further cause the apparatus to: transmit data to the receiver based on the received configuration information.

In some embodiments, the reference signal vectors over the L time intervals are expressed as a reference signal $X_{N\times L}$, where $X_{N\times L}=U_{N\times L} \cdot \Sigma_{L\times L} \cdot (V_{L\times L})^H$ and where the reference signal vectors are the reference signals from the N transmit antennas in the form of a N×1 complex vector at each of the L time intervals, $V_{L\times L}$ is a transmitter side precoding matrix, $U_{N\times L}$ is a is a receiver matrix, and $\Sigma_{L\times L}=I_{L\times L}$.

In some embodiments, the computer executable instructions further cause the apparatus to: transmit second configuration information that include information pertaining to one or more of: a maximum value of L; when a first reference signal vector is to be transmitted; or an indication of the transmitter side precoding matrix $V_{L\times L}$ and the receiver matrix $U_{N\times L}$.

BRIEF DESCRIPTION OF THE DRAWINGS

According to an aspect of the present disclosure, there are provided Brief Description of the Drawings For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

In conventional channel estimation as described in the background, a MIMO channel may be considered a linear transformation of a composite channel (i.e. multiple physical channels between transmitter antennas and receiver antennas) so that a receiver can use a linear mathematical mechanism, for example a Least-Squares (LS) or MMSE (Minimize mean square error) mechanism, to estimate channel coefficients of the composite channel. Each transmitter antenna-to-receiver antenna channel coefficient may be reduced to an element of a linear transformation matrix.

Figures 1A, 1B:
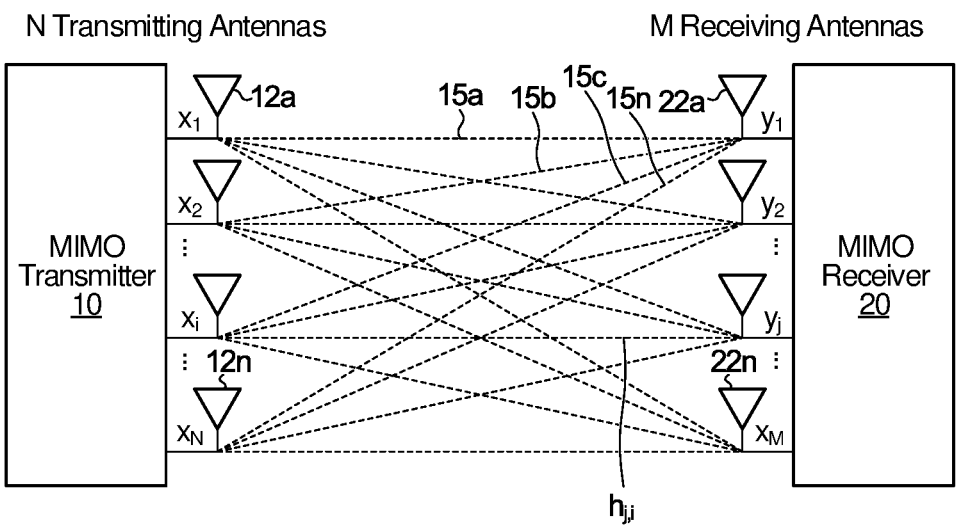
FIG. 1A is a block diagram of a M-by-N MIMO system including a N antenna transmitter and a M antenna receiver.
FIG. 1B is a representation of a Singular Value Decomposition (SVD) decomposition of a MIMO channel.

MIMO technology has been used in wireless systems since the introduction of the 3$^{rd}$ Generation (3G) standard. In 4th Generation (4G) and 5th Generation (5G) networks, a number of antennas in the transmitters and receivers of the networks has increased resulting in higher network capacity. A N-antenna transmitter 10 and a M-antenna receiver 20 result in a M×N MIMO channel $h_{ij}$ as shown in FIG. 1A. A M×N MIMO channel can be represented mathematically as a M×N channel matrix that is M columns by N rows and each of the elements of the matrix represents a channel between one of the N transmitter antennas and one of the M receiver antennas. Transmitter antenna 12a of transmitter 10 transmits a transmit signal $X_1$ over a channel 15a that is received by a receiver antenna 22a at the receiver 20. Transmitter antenna 12n of the transmitter 10 transmits a transmit signal $X_n$ over a channel 15n that is received by a receiver antenna 22a at the receiver 20. The other transmit antennas also transmit signals over respective channels, for example 15b and 15c, and are received by receiver antenna 22a at the receiver 20. The received signals over the multiple channels 15a, 15b, 15c and 15n are collectively indicated as received signal $Y_1$ at receiver antenna 22a. Each of the other receiver antennas also receive signals from each of the transmitter antennas in a similar manner as described for receiver antenna 22a. Capacity improvement may be based on a number of MIMO layers, also referred to as data streams. The number of MIMO layers may also be referred to as a rank of the M×N MIMO channel matrix. A higher rank means more parallel data streams, which enables a higher achievable capacity.

Mathematically speaking, the rank (r) has an upper-bound of r≤$r_{max}$=min(M,N). The value of $r_{max}$ has to be increased in order to increase the potential rank. Increasing the rank can often be aided by increasing a number of receiver antennas (M). Increasing the number (N) of transmitter antennas may strengthen the received signals, which is especially useful in high frequency bands. Thus, a wireless system may attempt to accommodate as many antennas as possible on both the transmitter side and the receiver side. For example, where a transmitter is a base station (BS) and a receiver is a UE, a UE may be simultaneously connected to multiple BSs, which allows the overall number of transmitter antennas to be combined. At higher carrier frequencies, which have shorter wavelengths, the resulting physical antenna size is smaller, which may allow more antennas at the UE side.

The use of rank in determining capacity is important for single user MIMO (SU-MIMO), multi-user MIMO (MU-MIMO), and Massive-MIMO technologies. A UE measures the capacity of a downlink (DL) MIMO channel by detecting its rank. Rank-detection is an operation that may be performed by a UE in DL.

A M×N MIMO channel may be simplified into a M×N complex matrix $H_{M×N}$, whose matrix elements are each a representation of a point-to-point channel coefficient (which may be complex-valued) from one transmitter antenna to one receiver antenna. For example, $H_{j,i}$ is one channel coefficient from an ith transmitter antenna, for i=1 to N, to a jth receiver antenna for j=1 to M, as illustrated in the MIMO system 5 in FIG. 1A. The complex matrix $H_{M×N}$ is populated by the coefficients $H_{j,i}$.

After performing channel estimation to determine the coefficients of the channel matrix $H_{M×N}$, a receiver may decompose the matrix in the form $H_{M×N}$=U·Σ·$V^H$, where Σ is a diagonal singular matrix containing $r_{max}$=min(M, N) singular values, U is a left eigen-matrix, and V is a right eigen-matrix. The matrix decomposition may be performed by a mathematical operation known as singular value decomposition (SVD). FIG. 1B is a representation of the SVD decomposition process of the MIMO channel matrix. A received signal is represented in the form Y=H*X+N, where H is representative of the channel, X is the signal transmitted by the transmitter and N is noise in the system. Substantially ignoring the noise component, Y=H*X and based on the knowledge that the channel matrix may be decomposed in the form $H_{M×N}$=U·Σ·$V^H$, the signal at the receiver may be expressed as decompose the matrix in the form Y=U·Σ·$V^H$*X.

Figure 1C:
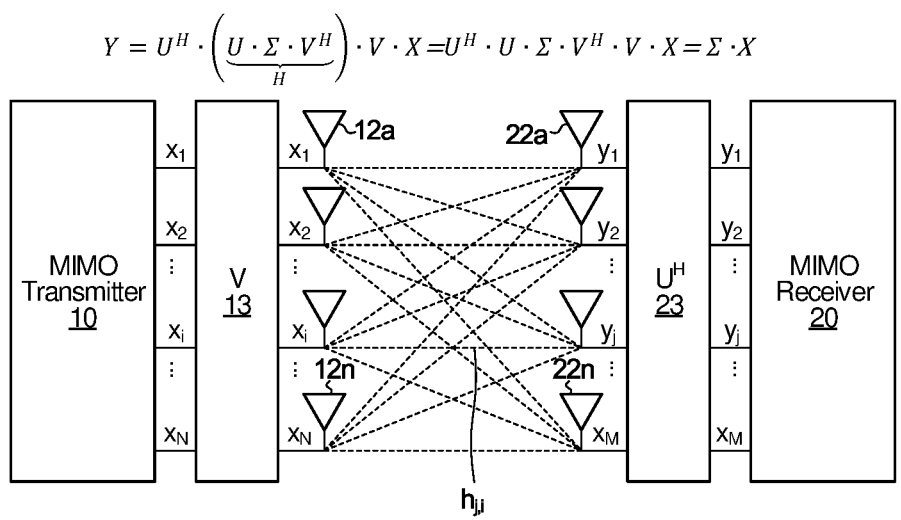
FIG. 1C is a block diagram of a M-by-N MIMO system including a N antenna transmitter and a M antenna receiver illustrating the use of a precoding matrix at the transmitter and a receiver matrix at the receiver.

The receiver may inform the transmitter of the eigen matrix V or eigen matrices Σ and V in order for the transmitter to use the content of V as a precoding matrix at the transmitter to compensate the MIMO channel. Furthermore, the receiver may use $U^H$ as a receiving matrix to aid in compensating the MIMO channel. FIG. 1C illustrates another block diagram of a MIMO system. The same numbering is used for similar elements as shown in FIG. 1A.

The MIMO system 7 includes the N-antenna transmitter 10 and the M-antenna receiver 20. Between the transmitter 10 and the transmitter antennas 12a to 12n is the precoding matrix V 13 that generates the signals $X'_1$ to $X'_N$ to be transmitted from the respective antennas 12a to 12n of transmitter 10. The signals transmitted from each of the transmit antennas 12a to 12n are received at the receive antennas 22a to 22m over the multiple channels and are collectively indicated as received signals $Y'_1$ to $Y'_M$ at the receiver antennas 22a to 22m. The received signals $Y'_1$ to $Y'_M$ from the receiver antennas 22a to 22m are applied to the receiving matrix $U^H$ 23, which after processing result in the signals $Y_1$ to $Y_M$. Because V and U are unity matrixes ($U^H \cdot U = I$ and $V^H \cdot V = I$, where I is an identity matrix, i.e. a matrix with a value of 1 on the diagonal and zeroes elsewhere), the precoding matrix V 13 and receiving matrix $U^H$ 23 can cancel out V and U, resulting in $Y = \Sigma \cdot X$. Therefore, X (singular values) can be considered to determine the MIMO channel from X to Y.

Figure 1D:
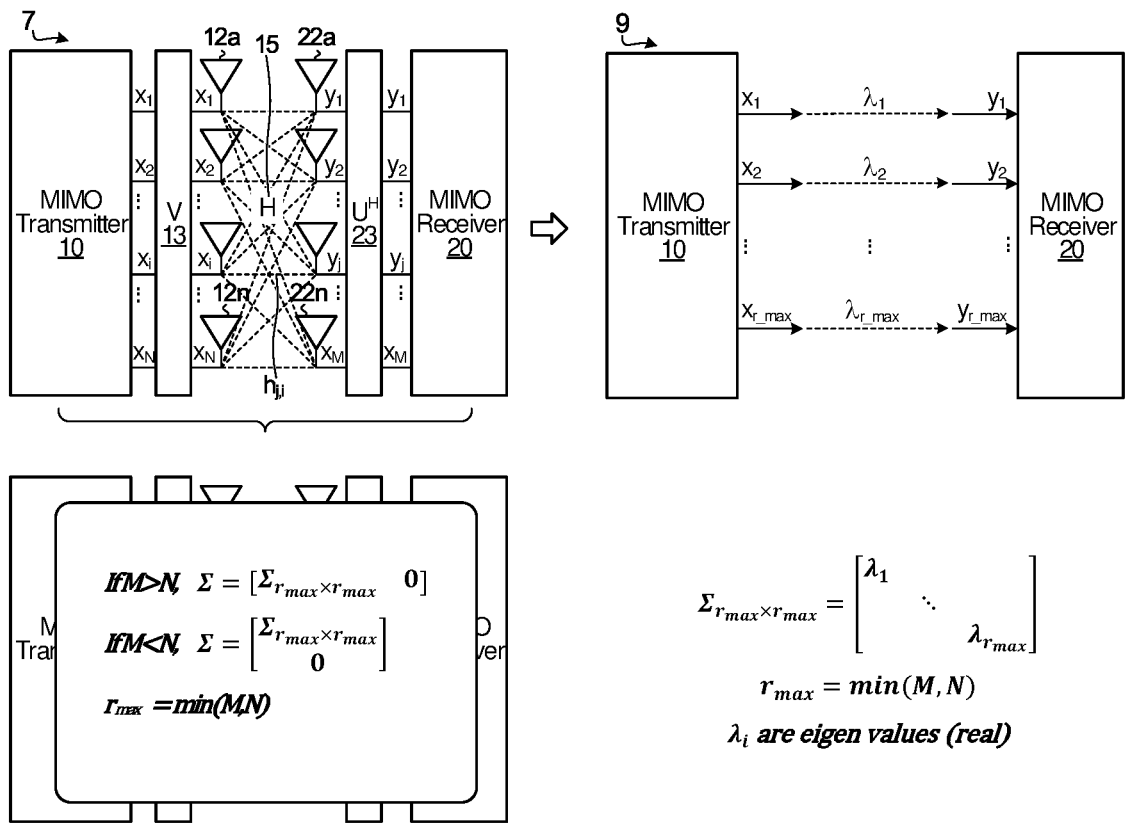
FIG. 1D is a schematic diagram that illustrates how capacity of a M×N MIMO channel can be determined.

FIG. 1D illustrates how the MIMO system 7 of FIG. 1C may be expressed in an alternative manner, i.e. as represented by MIMO system 9, in which there is a set of one-to-one relationships, each one-to-one relationship between a single transmitter antenna and a single receiver antenna. FIG. 1D illustrates that when considering the combination of the precoding matrix V 13, the receiving matrix $U^H$ 23 and the channel 15 between the two matrices, if the number of receiver antennas M is greater than the number of transmitter antennas N, then $\Sigma$ is equal to a matrix representation $[\Sigma_{rmax}x_{rmax}\ 0]$, where $$\Sigma_{rmax X rmax} = \begin{bmatrix} \lambda_1 & & \\ & \ddots & \\ & & \lambda_{rmax} \end{bmatrix},$$

$r_{max} = \min(M, N)$ and $\lambda_i$ are eigen values and other values in the matrix representations are zero valued. If the number of receiver antennas M is less than the number of transmitter antennas N, then $\Sigma$ is equal to a matrix representation $$\begin{bmatrix} \Sigma_{rmax X rmax} \\ 0 \end{bmatrix}.$$

In the representation of the MIMO system 9, it is seen how the MIMO channel $H_{M \times N}$ may be expressed in the form of $r_{max}$ independent streams $\lambda_1, \lambda_2, \ldots, \lambda_{r\_max}$ from the transmitter 10 to the receiver 20.

Not all singular values $\lambda_i$ of $\Sigma$ are considered strong enough to represent a transmission channel that can carry a transmission data stream (i.e. a MIMO layer). A weak singular value $\lambda_i$ (the singular value is always positive and real valued) attenuates $x_i$ in the form $y_i = \lambda_i \cdot x_i$, whereas a strong singular value $\lambda_i$ would increase $x_i$. Strong singular values $\lambda_i$ may be referred to mathematically as "leading singular values". The more leading singular values that are determined, the higher the rank of the MIMO channel and therefore the larger the number of data streams that may simultaneously occur resulting in a higher capacity for the MIMO channel.

Because the MIMO channel is a natural and passive phenomenon that includes obstacles, reflections, and may result in fading between the transmitter and the receiver, neither of the transmitter and receiver can change the characteristics of the channel. However, the transmitter and receiver may detect the channel rank, and if the rank is determined to be a large rank, the channel will have a higher capacity potential, but if the rank is a small rank, the channel will have a lower capacity potential. If $\lambda_i$ is greater than a threshold value, the ith layer may be chosen as an effective layer to transmit a data stream. If $\lambda_i$<than the threshold value, the ith layer is not used for transmitting a data stream. The effective rank is less than or equal to $r_{max} = \min(M, N)$. In some embodiments, for a data layer with a larger $\lambda_i$, a less robust, but higher spectrum efficient modulation and coding scheme (MCS) may be used for transmitting the data stream. In some embodiments, for a data layer with a smaller $\lambda_i$, a more robust, but lower spectrum MCS may be used for transmitting the data stream.

In summary, in some embodiments, the rank of the MIMO channel may be used by the receiver to determine the capacity of the MIMO channel.

Figure 2A:
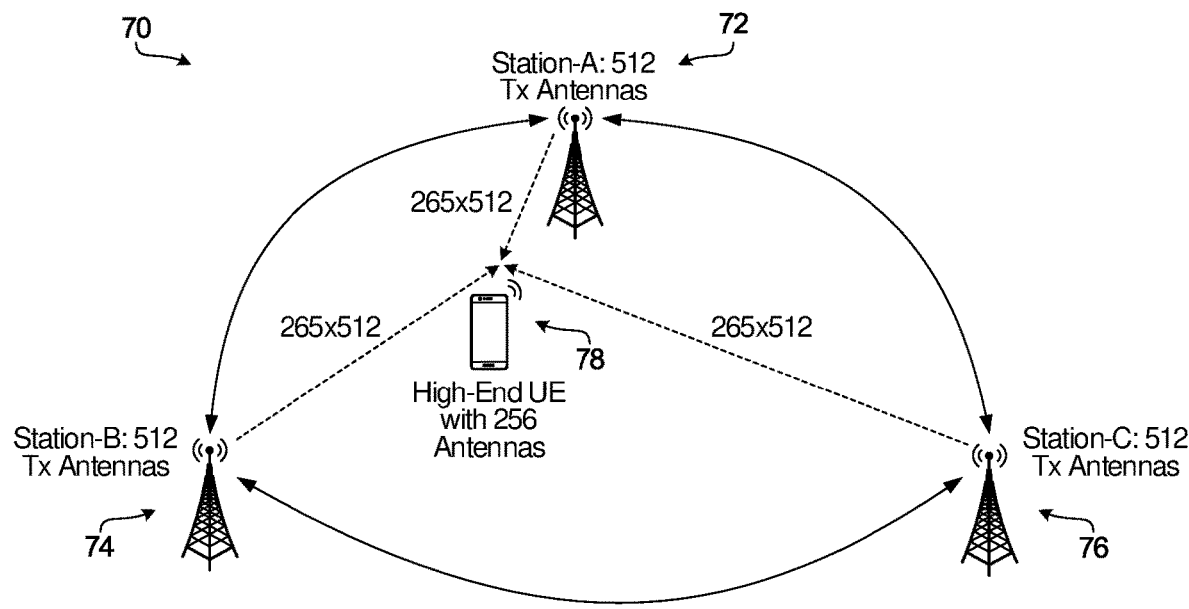
FIG. 2A is a schematic diagram of MIMO in multiple connected mode where a single UE is connected to three terrestrial base stations.
Figure 2B:
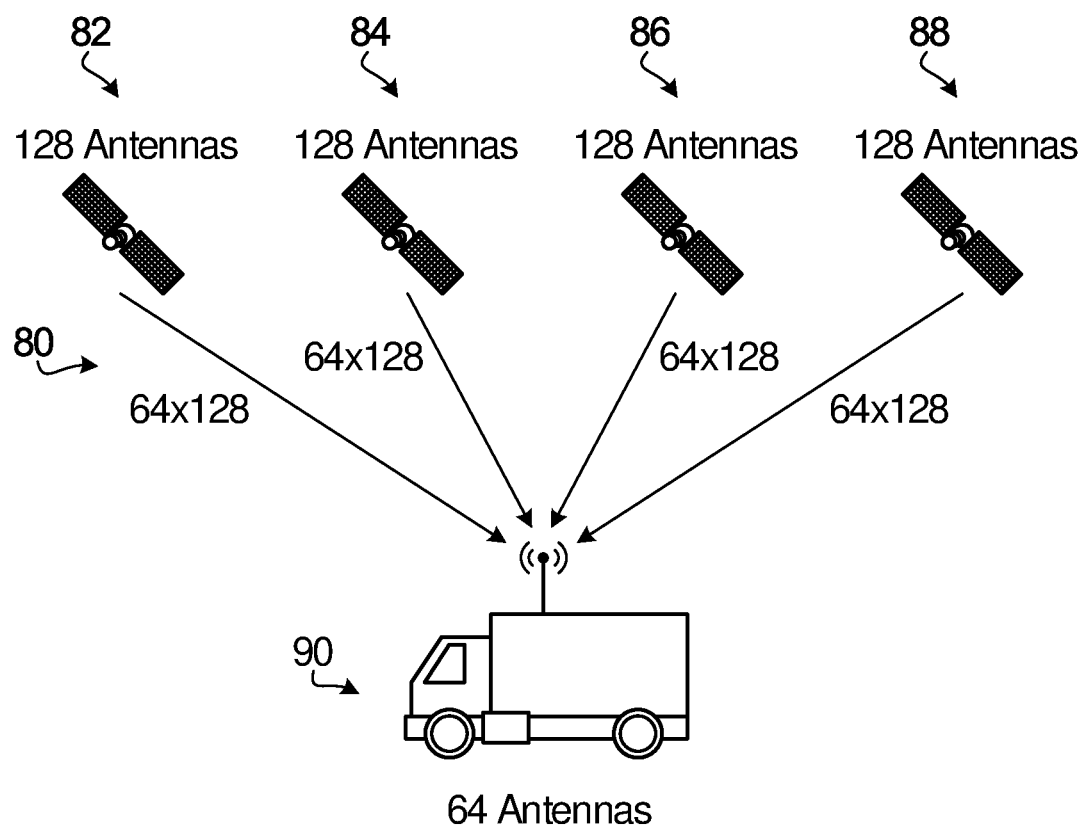
FIG. 2B is a schematic diagram of a MIMO system in multiple connected mode where a single UE, in this case a vehicle, is connected to four non-terrestrial base stations.

Rank detection in prior art systems depends on performing the SVD operation over the entire MIMO channel matrix, causing resource expensive multiplexing and measurement, as well as high device storage space, computational complexity and difficulty in accommodating more antennas, for example, the massive antenna system shown in FIG. 2A and FIG. 2B.

FIG. 2A illustrates a portion of a network 70 including several terrestrial BSs 72, 74, and 76 that are connected with one another by wired or wireless backhaul that create a massive transmit antenna system for communicating with UEs that are served by the BSs. Each of BSs 72, 74 and 76 has 512 transmitter antennas. A single UE 78 having 256 antennas is shown in communication with the three BS 72, 74, and 76. In this example, the total number of transmitter antennas N of the three BS is 1536 transmitter antennas, resulting in a composite DL MIMO channel that is 1536 transmitter antennas by 256 receiver antennas. As suggested by this example, the number N of transmitter antennas may reach on the order of thousands or tens of thousands when multiple BS each having a large number of antennas are implemented in a network. Furthermore, in the future, high-end UEs, an example of which may be an automobile, may have a number of antennas on the order of hundreds.

In theory, the UE 78 may detect the capacity of the composite DL MIMO channel for the connections with BSs 72, 74 and 76 by detecting the rank. However, as discussed previously, such a large composite DL MIMO channel would require a significant frequency, time, code, or combination thereof, multiplexed resource, to enable transmission of 1536 reference signals corresponding to the 1536 transmitter antennas indicated in FIG. 2A.

In addition to a multiple terrestrial BS scenario shown in FIG. 2A, FIG. 2B shows another portion of a network 80 including multiple non-terrestrial BSs 82, 84, 86 and 88 in connection with a terrestrial UE 90, which is a vehicle. The UE 90 has 64 antennas. The BSs are satellites and each satellite includes 128 antennas resulting in a composite MIMO channel of 64 UE antennas and 512 BS antennas in order to strengthen received signals. While FIG. 2B shows the non-terrestrial BSs to be satellites, it should be understood that the non-terrestrial BSs could be other types of devices such as airships, drones, quadcopters, balloons or other aerial devices.

An aspect of some embodiments provided in this disclosure involves estimating a high-dimensional MIMO channel by expressing the MIMO channel in the form of a flow function to determine a change from an input state to an output state. This may be considered similar to a manner in which fluid dynamic problems are solved. Instead of using linearization to estimate all of the coefficients of a matrix representing a MIMO channel, a receiver may determine the MIMO channel rank by detecting leading modes in a subspace of the entire MIMO channel matrix. An EVD process used to find eigen values belongs to a branch of mathematics known as "mode theory" which pertains to determining modes. The modes in the present disclosure correspond to the channels that carry the independent data streams. A complex eigenvalue with both large real and imaginary parts indicates a persistent mode. Rank may be a special measurement of a mode, without considering its decay period. If an eigenvalue is smaller than a threshold value, then the eigenvalue may not be considered a leading eigenvalue and will not contribute to the rank of the MIMO channel.

For example, instead of determining the rank of the MIMO channel using SVD in a convention channel estimation approach, embodiments of the present disclosure involve determining leading modes of a MIMO channel that is expressed as a function change from an input state to an output state. Moreover, the leading modes may be detected within a mathematical sub-space with less measurement and calculation being performed by the UE. Therefore, generating a reduced channel representation may be based on determining the leading modes of a MIMO channel that is represented as a function in a similar manner to a fluid dynamics representation.

According the embodiments of the present disclosure, a prohibitively large number of resources are not needed in terms of the reference signal overhead, even if the number of antennas in the link between a transmitter and receiver is increased. Besides, when a UE wakes up from a powered down state and measure a capacity of a MIMO channel, the UE does not need to wake up frequently to measure for channel estimation and computation of channel rank, and UE power could be saved dramatically. Compared to the manner of conventional rank detection, the embodiments provided in the present disclosure may support an increase in the number of transmitter antennas (N) and/or receiver antennas (M) in MIMO systems. In addition, there is no issue of complexity of the calculations and the memory needed when performing the calculations to increase exponentially with increasing N and M, as would be the case with conventional rank detection.

FIGS. 3A, 3B, 4A, and 4B following below provide context for the network and device that may be in the network and that may implement aspects of the present disclosure.

Figure 3A:
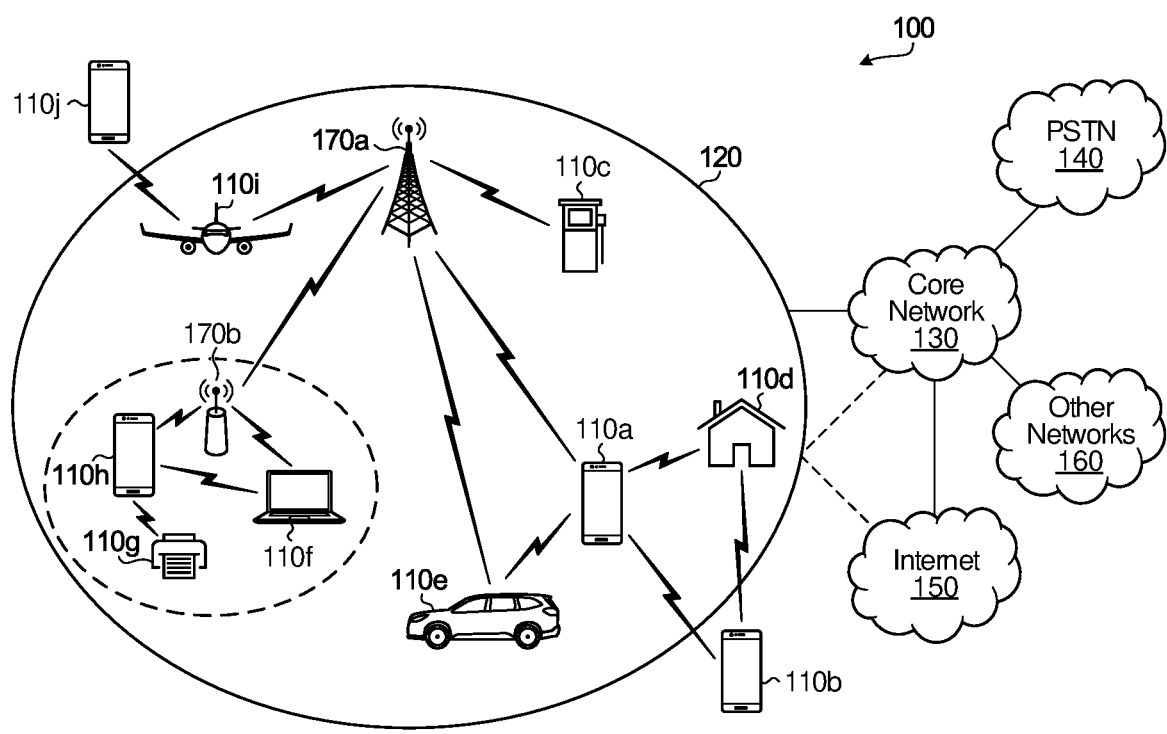
FIG. 3A is a schematic diagram of a communication system in which embodiments of the disclosure may occur.

Referring to FIG. 3A, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110a-120j (generically referred to as 110) may be interconnected to one another, and may also or instead be connected to one or more network nodes (170a, 170b, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 3B:
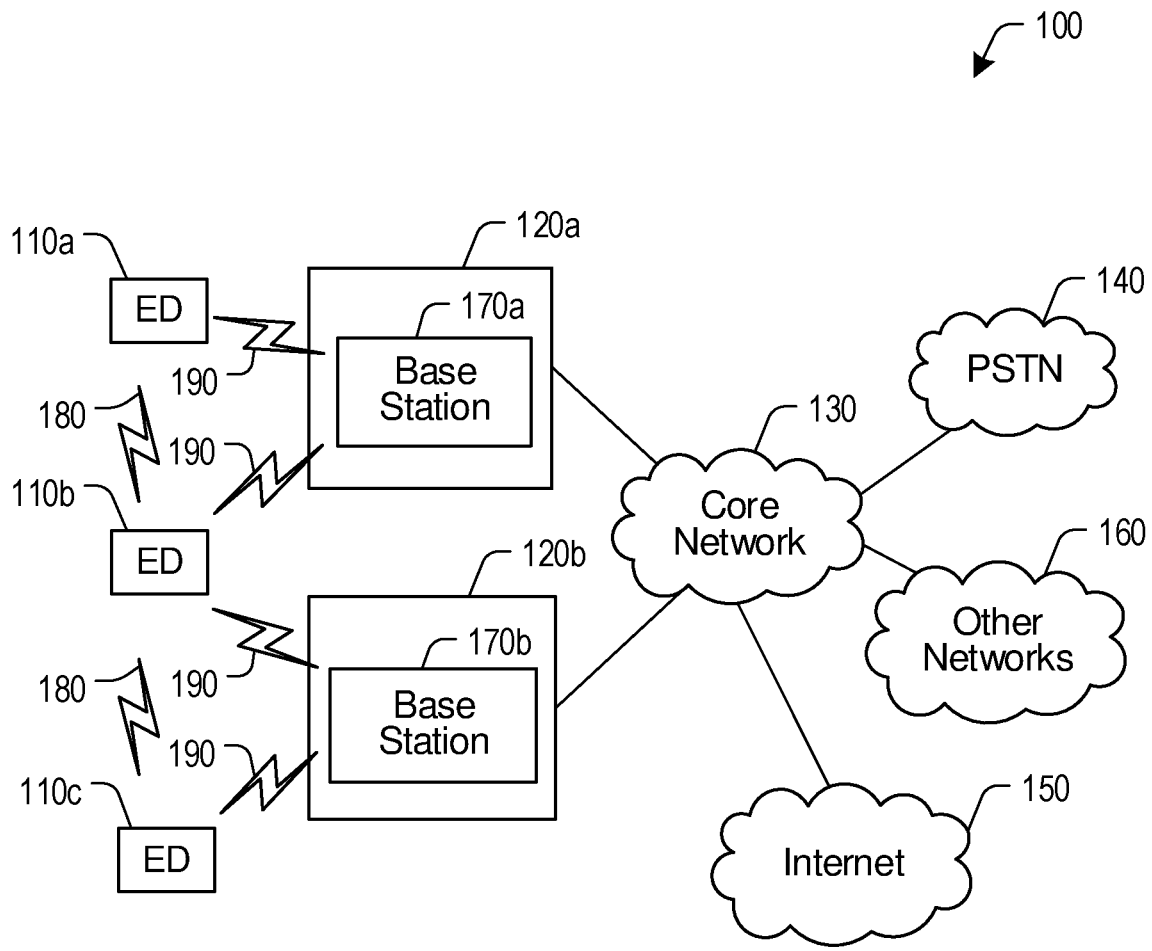
FIG. 3B is another schematic diagram of a communication system in which embodiments of the disclosure may occur.

FIG. 3B illustrates an example communication system 100 in which embodiments of the present disclosure could be implemented. In general, the system 100 enables multiple wireless or wired elements to communicate data and other content. The purpose of the system 100 may be to provide content (voice, data, video, text, or even neural network's coefficients and gradients) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 3B, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device, Internet of Things (IoT) device, wearable device, or vehicular device (or vehicle-mounted device, vehicle on-board equipment).

FIG. 3B illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text, or even neural network's coefficients and gradients) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 3B, any reasonable number of these components or elements may be included in the communication system 100.

The EDs 110a-110c are configured to operate, communicate, or both, in the communication system 100. For example, the EDs 110a-110c are configured to transmit, receive, or both, via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 3B, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router.

In some examples, one or more of the base stations 170a-170b may be a terrestrial base station that is attached to the ground. For example, a terrestrial base station could be mounted on a building or tower. Alternatively, one or more of the base stations 170a-170b may be a non-terrestrial base station that is not attached to the ground. A flying base station is an example of the non-terrestrial base station. A flying base station may be implemented using communication equipment supported or carried by a flying device. Non-limiting examples of flying devices include airborne platforms (such as a blimp or an airship, for example), balloons, quadcopters and other aerial vehicles. In some implementations, a flying base station may be supported or carried by an unmanned aerial system (UAS) or an unmanned aerial vehicle (UAV), such as a drone or a quadcopter. A flying base station may be a moveable or mobile base station that can be flexibly deployed in different locations to meet network demand. A satellite base station is another example of a non-terrestrial base station. A satellite base station may be implemented using communication equipment supported or carried by a satellite. A satellite base station may also be referred to as an orbiting base station.

Any ED 110a-110c may be alternatively or additionally configured to interface, access, or communicate with any other base station 170a-170b, the internet 150, the core network 130, the PSTN 140, the other networks 160, or any combination of the preceding.

The EDs 110a-110c and base stations 170a-170b are examples of communication equipment that can be configured to implement some or all of the operation and/or embodiments described herein. In the embodiment shown in FIG. 3B, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSPUA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access operation, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more sidelink (SL) air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In addition, some or all of the EDs 110a-110c may include operation for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

Figure 4A:
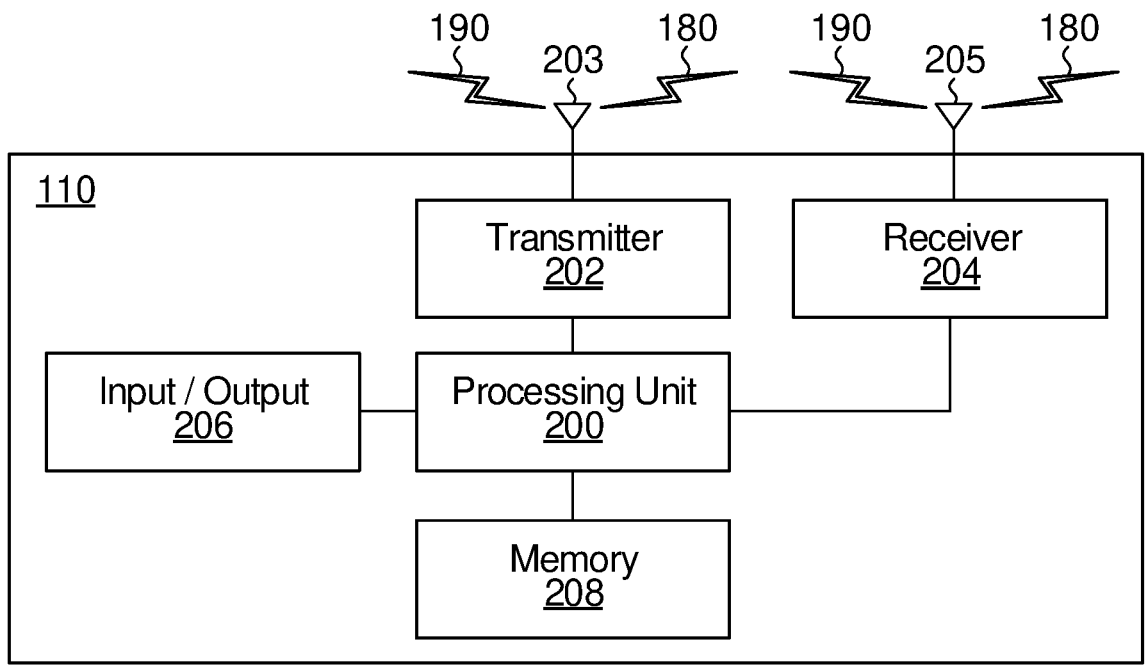
FIGS. 4A and 4B are block diagrams of an example user equipment and base station.
Figure 4B:
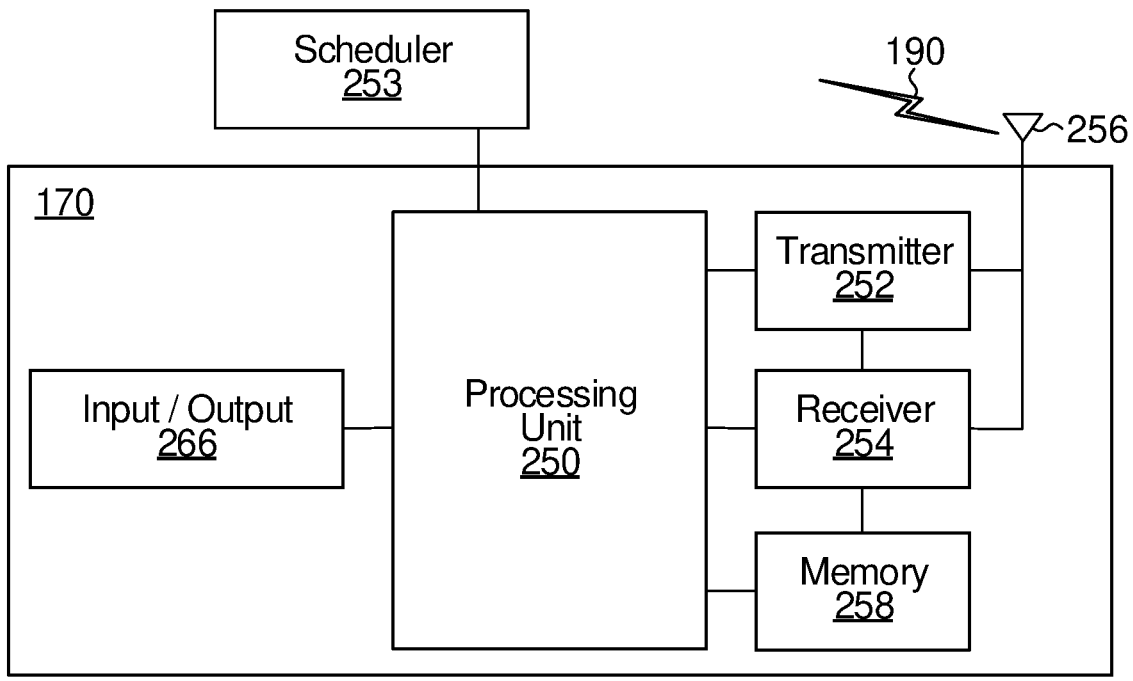

FIGS. 4A and 4B illustrate example devices that may implement the methods and teachings according to this disclosure. In particular, FIG. 4A illustrates an example ED 110, and FIG. 4B illustrates an example base station 170. These components could be used in the system 100 or in any other suitable system.

As shown in FIG. 4A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna 204 or Network Interface Controller (NIC). The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the operations and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 4B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the operations and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the operations and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

A MIMO channel may be expressed as a linear transformation over a time window where characteristics of the channel do not change significantly, which can be referred to as a coherent time window, in the form:

$$Y_{M\times 1} = H_{M\times N} \cdot X_{N\times 1}$$

where $X_{N\times 1}$ is signal transmitted by N transmitter (Tx) antennas in the form of a N×1 vector, $Y_{M\times 1}$ is signal received by M receiver (Rx) antennas in the form of a M×1 vector, and $H_{M\times N}$ is a MIMO channel complex value matrix.

If M=N, the linear transformation is considered to be bijective; if M<N, the linear transformation is considered to be surjective; and if M>N, the linear transformation is considered to be injective. For a surjective linear transformation, when the UE has substantially less antennas than the number of antennas possessed by the BSs in communication with the UE, i.e. M<<N, the transmitter may multiplex several reference signals on each Tx antenna to avoid any collisions between any two Tx antennas, thereby allowing the UE to estimate the MIMO channel in the form of matrix $\hat{H}_{M\times N}$. However, the UE cannot start to compute the SVD of $\hat{H}_{M\times N}$ until all of the reference signals that are multiplexed by the BSs are available to the receiver. If N is a large number (e.g. due to collaboration among multiple BSs), N reference signals may be a significant amount of DL radio resource and the SVD of $\hat{H}_{M\times N}$ would incur a significant amount of computational energy by the UE as well as taking a longer period of time to receive the entire set of multiplexed reference signals over the DL radio resources.

In embodiments of the present disclosure, a fast and economical rank detection may be performed by modeling a MIMO channel as a flow function. In some embodiments, this may be in a similar manner to a fluid dynamics function. Expressing the MIMO channel as a flow function may take the form:

$$Y_{M\times 1}^t = F(X_{N\times 1}^t), t=1,2,3,\ldots,L$$

where $X_{N\times 1}^t$ is a signal transmitted by N Tx antennas in the form of a N×1 vector at time t, $Y_{M\times 1}^t$ is a signal received by M Rx antennas in the form of a M×1 vector at the time t, L is an integer that corresponds to the total number of time intervals and F(•) is a function that is representative of the MIMO channel over an L-interval measurement time window.

In embodiments of the present disclosure, $X_{N\times 1}^t$ is a vector of reference signals that is transmitted without any multiplexing of the reference signals. As opposed to a conventional MIMO system in which the transmitter multiplexes the reference signals over a set of radio resources such as time, frequency and codes, that are a function of the number of N transmit antennas, in the proposed method, all N Tx antennas allocated to be used for transmitting reference signals transmit the reference signals during each of L time intervals, i.e., the transmitter doesn't multiplex the reference signals.

Each antenna of the receiver receives signals from each of the transmitter antennas. Therefore, at a given time t=1, 2, . . . , L, the signal from each receive antenna may be combined in the form of a received signal vector $Y_{M\times 1}^t$. After receiving $Y_{M\times 1}^t$ for each of time intervals t=1, 2, . . . , L, the receiver accumulates the L vectors into a received signal matrix $Y=[Y_{M\times 1}^1, Y_{M\times 1}^2, \ldots, Y_{M\times 1}^L]$. The receiver may also generate a reference matrix $X=[X_{N\times 1}^1, X_{N\times 1}^2, \ldots, X_{N\times 1}^L]$ based on the fact that the intended reference signals are known by the receiver, where L<M, and M≤N. In some examples, L<M<<N.

As indicated above, the rank of a MIMO matrix $\hat{H}_{M\times N}$ corresponds to a number of leading modes of a flow function $F(X_{N\times 1}^t)$.

Prior to discussion about mode detection according to embodiments of the present disclosure, an analysis of determining the rank of a MIMO channel matrix will be provided. A M×N MIMO channel having a rank equal to the number of receiver antennas M, which can be referred to as a "full rank", for a large value of M is a somewhat rare occurrence. In contrast, a rank of a M×N MIMO channel is usually smaller than M, and sometimes is much smaller than M. For example, a 16 receiver antenna UE may have an average rank of 4 to 8, i.e. less than the entire number of receive antennas. Using this as a basis, it is possible to detect modes within a sub-space, or a space that is less than the entire M×N size, in order to reduce calculation complexity at the receiver.

In some embodiments, to detect modes within a sub-space, the receiver projects the received signal matrix (Y) into a pre-defined sub-space in which leading modes may be counted to determine the rank. The projection into the sub-space results in a reduction of the size of the matrix manipulation that needs to be performed thereby reducing the receiver's memory needs and computational complexity of determining the rank.

The projection into the sub-space may be considered a viable solution in some embodiments because a low-capability UE would not expect a high rank MIMO channel, possibly because a low-capability UE would not have many receive antennas. Furthermore, using such a projection into the sub-space may be considered a viable solution in some embodiments because channel sounding may limit the rank of a MIMO channel in a particular area. Furthermore, even if both the base station and UE have a sufficient number of antennas, their achievable rank may still be small due to an area in which they are located, for example, in an urban area it may be hard to obtain a high rank MIMO channel.

In the function $Y_{M\times 1}^t = F(X_{N\times 1}^t)$ for intervals t=1,2, 3, . . . , L, the value of L may be considered a maximum number of possible leading modes. In a particular example, for a 128 antenna receiver by 1535 antenna transmitter MIMO system, where L is selected by the transmitter to be 64, the maximum rank that would possibly be detected is 64.

In some embodiments, the transmitter, or possibly the network, selects the maximum possible rank for a channel between the transmitter and the receiver. In making the selection the transmitter considers one or more of: the transmitter's previous experience with receivers that the transmitter has served; receiver capability; and service that the MIMO channel is being used for. With regard to previous experience, the transmitter may select a value for L based on historical experience because the transmitter is assumed to know the surrounding environment. For example, if no other associated receivers being served by the transmitter has a rank higher than 8, the transmitter will not expect a new receiver to have a rank higher than 8. With regard to UE capability, the receiver may inform the transmitter of the receiver's capability. Based on the receiver capability, the transmitter may adjust the value of L for the receiver's N-by-M MIMO channel. In some embodiments, receiver capabilities are predefined by categories and the receiver reports its category to the transmitter. When the reported categories of two or more receivers sharing the reference signal are different, the transmitter may select L based on the receiver with the higher capability. When receivers share the same category, the receivers could be allocated the same reference signal. With regard to the service factor, although a high capability category receiver may be able to process a high-rank MIMO signal, it is unnecessary for the receiver to perform at a highest rank it is capable of at all times. When conducting low-throughput service, the receiver may use a low-rank MIMO channel by informing the transmitter the maximum rank that it expects for this low throughput service. In some embodiments, Quality of Service (QoS) may be used as a parameter to aid in determining L.

Considering information about the capability of receivers the transmitter is serving, the transmitter selects a maximum value of L for all the receivers. The transmitter sends configuration information to the receivers providing the selection of L. In some embodiments, the transmitter may also indicate a total number of transmitter antennas N in the configuration information. The maximum value of L will be less than or equal to the number of antennas of the receiver having the least number of antennas.

The expression $Y_{M\times 1}^t = F(X_{N\times 1}^t)$ may be more generally expressed for all time t=1,2,3, . . . , L as Y=F(X) where Y∈$\mathcal{C}^{M\times L}$ represents the received signals over the L consecutive time intervals and X∈$\mathcal{C}^{N\times L}$ represents the known reference signals over the L consecutive time intervals.

The reference signal matrix X∈$\mathcal{C}^{N\times L}$ may be decomposed using a SVD operation into $X_{N\times L} = U_{N\times L} \cdot \Sigma_{L\times L} \cdot (V_{L\times L})^H$, where $(U_{N\times L})^H \cdot U_{N\times L} = I_{L\times L}$, $(V_{L\times L})^H \cdot V_{L\times L} = I_{L\times L}$, and wherein $\Sigma_{L\times L}$ is a diagonal matrix containing real-valued coefficients and $I_{L\times L}$ is an identity matrix. In another words, $\Sigma_{L\times L}$ is a full-rank square matrix. For simplicity and without loss of generality, $\Sigma_{L\times L}$ can be set equal to $I_{L\times L}$.

In some embodiments, when M<<N, the receiver may augment $Y \in \mathcal{C}^{M \times L}$ to generate $X' \in \mathcal{C}^{N \times L}$ by zero padding each of the L $Y_{M \times 1}{}^t$ vectors in order to align with the size of $X \in \mathcal{C}^{N \times L}$. Therefore, $X' \in \mathcal{C}^{N \times L}$ may be expressed mathematically as $$X''_{N \times 1} = \begin{bmatrix} Y^t_{M \times 1} \\ 0_{(N-M) \times 1} \end{bmatrix}.$$

The MIMO channel may be represented in the form of a flow function to reflect a change from the transmitted reference signals $X \in \mathcal{C}^{N \times L}$ (input state) to the augmented received version of the reference signals $X' \in \mathcal{C}^{N \times L}$ (output state), which may be expressed as:

$$X' = F(X).$$

The function $F(\bullet)$ can be approximated to that of a linear transformation matrix H, wherein the leading eigenvalues of the matrix H are the leading modes. As a result, the augmented received version of the reference signals $X' \in \mathcal{C}^{N \times L}$ may be expressed as $$X' \approx H \cdot X = H \cdot U \cdot (V)^H$$

where, as indicated above, $\Sigma_{L \times L} = I_{L \times L}$.

The expression $X' = H \cdot U \cdot (V)^H$ can be solved as a regression with known $X'$, U, and V and unknown H. Although a straightforward solution may be determined using a LS (least squares) operation of the relation $H = X' \cdot V \cdot (U)^H$, the matrix $H_{N \times N}$ is typically too large, in terms of memory requirements and a computational operation, for an eigen value decomposition (EVD) operation. Therefore, as proposed in the present disclosure, the matrix $H_{N \times N}$ is projected into a sub-space by U in the form of $\tilde{H} = (U)^H \cdot H \cdot U$, which may be further expressed as:

$$\tilde{H} = (U)^H \cdot H \cdot U = (U)^H \cdot X' \cdot V \cdot \underbrace{(U)^H \cdot U}_{I} = (U)^H \cdot X' \cdot V.$$

The resulting sub-space $\tilde{H}_{L \times L}$ matrix is a reduced size matrix as compared to the MIMO channel matrix $H_{N \times N}$, but the $\tilde{H}_{L \times L}$ matrix has the same non-zero eigenvalues as the MIMO channel matrix $H_{N \times N}$. This is to say that the modes of $\tilde{H}_{L \times L}$ are exactly those of $H_{N \times N}$. Therefore, $$\tilde{H} \cdot \Omega = \Omega \cdot \Lambda$$

where $\Omega$ are eigen-vectors and the diagonal entries of the diagonal matrix $\Lambda \in \mathcal{C}^{L \times L}$ are eigenvalues of the full-space $H_{N \times N}$. The number of non-zero eigenvalues corresponds to the rank of the MIMO channel. Moreover, the eigenvector $\Phi$ of the full-space $H_{N \times N}$ may be expressed as $$\Phi = X' \cdot V \cdot \Omega.$$

The following expression shows that $\Phi$ is the eigenvector of $H_{N \times N}$ and $\Lambda$ is the eigenvalues of $H_{N \times N}$:

$$H \cdot \Phi = (X' \cdot V \cdot (U)^H) \cdot (X' \cdot V \cdot \Omega) =$$

$$X' \cdot V \cdot \underbrace{(U)^H \cdot X' \cdot V}_{\tilde{H}} \cdot \Omega = X' \cdot V \cdot \underbrace{\tilde{H} \cdot \Omega}_{\Omega \cdot \Lambda} = \underbrace{X' \cdot V \cdot \Omega}_{\Phi} \cdot \Lambda = \Phi \cdot \Lambda.$$

The eigenvalues of $H_{N \times N}$ may be complex-valued and therefore may not be exactly equal to the real-valued singular values of $H_{M \times N}$ in the expression $Y_{M \times 1} = H_{M \times N} \cdot X_{N \times 1}$. However, the eigenvalues of $H_{N \times N}$ have very strong correspondence to the real-valued singular values of $H_{M \times N}$.

Figure 5A:
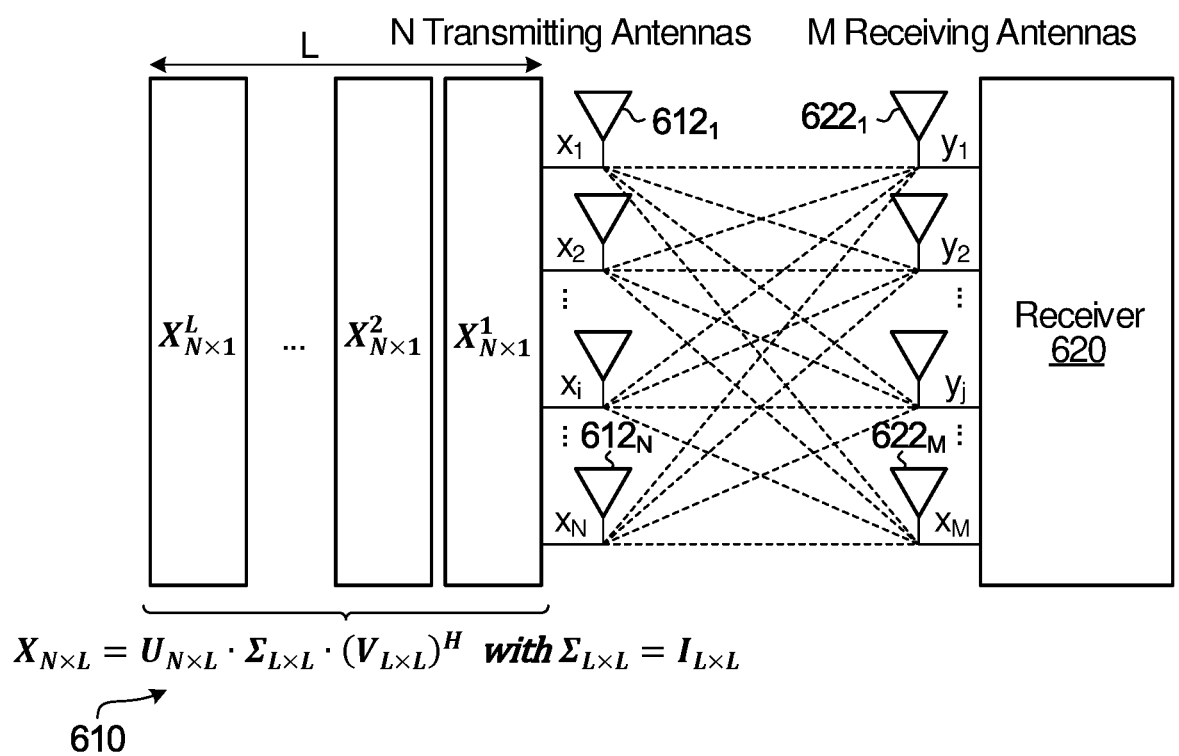
FIG. 5A is a block diagram of a MIMO system including a N antenna transmitter and a N antenna receiver according to embodiments of the present disclosure.

An example of applying a flow function approach in order to reduce the complexity of MIMO channel capacity detection will now be described with reference to FIGS. 5A, 5B, and 5C. FIG. 5A illustrates a schematic diagram of a set 610 of reference signal vectors $X_{N \times 1}{}^L$ to be transmitted by a transmitter (not shown) to a receiver 620, where N is the number of transmitter antennas $612_1$ to $612_N$ over which the reference signals will be transmitted and L is the number of time intervals over which the reference signals will be transmitted. The N transmitter antennas $612_1$ to $612_N$ transmit signals $X_1$ to $X_N$, at a given time interval t=1, 2, . . . , L, such that each of the N transmitter antennas is transmitting one of the $X_{N \times 1}$ vector coefficients. The receiver 620 has M receiver antennas $622_1$ to $622_M$. The reference signals when travelling in the MIMO channel are consistent with the description of the M by N MIMO system described above with reference to FIG. 1A.

A number of the reference signal matrixes (or sequences), in terms of L and N, may be predefined and therefore known to both the transmitter and the receiver. After selecting the maximum rank L, the transmitter generates the reference signal matrix $X_{N \times L}$. The reference signal matrix $X_{N \times L}$ may be generated based on pre-defined tables, in formulas, or even in some seed tables (small size) with a series of formulas to extend smaller tables to larger sized tables in a nested way in order to reduce the description complexity. In some embodiments, both the transmitter and the receiver are aligned to the same $X_{N \times L}$.

In some embodiments, the reference signal matrix $X_{N \times L}$ is a full-rank matrix and all of the singular values of the matrix are 1 or very close to 1 for the sake of computation simplicity. $X_{N \times L} = U_{N \times L} \cdot I_{L \times L} \cdot (V_{L \times L})^H$, where $I_{L \times L}$ is identity matrix.

A portion of the configuration information that the transmitter sends to the receiver, is an identification of the time that the transmitter will be sending the reference signals and the first radio resource used to transmit $X_{N \times L}$. The transmitter sends the first vector $X_{N \times 1}{}^1$ (i.e. the first column of $X_{N \times L}$) over all the N transmission antennas in a first transmission time opportunity. The second vector $X_{N \times 1}{}^2$ (the second column of $X_{N \times L}$) is transmitted over all the N transmission antennas in the second transmission time opportunity, and so on until the remainder of the reference signal vectors of $X_{N \times L}$ are transmitted over the L transmission time opportunities.

In some embodiments, the L transmission time opportunities are consecutive. In some embodiments, the L transmission time opportunities are not consecutive and intervals between each of the L transmission time opportunities are not uniform. In some embodiments, when the L transmission time opportunities are not consecutive and intervals between each of the L transmission time opportunities are uniform. For example, the transmitter may transmit a first reference signal vector $X_{N \times 1}{}^i$ at a first time slot and may transmit a second reference signal vector $X_{N \times 1}{}^{i+1}$ at a third time slot and a third reference signal vector $X_{N \times 1}{}^{i+2}$ at a fifth time slot. Uniform transmission provides the receiver a measurement of the MIMO channel over a uniform interval of time so that the receiver may estimate the dynamics (or decay) of sub-channels.

After the transmission of the reference signals on the total of L consecutive time intervals, $X_{N \times 1}{}^t$, t=1, 2, . . . , L, at the receiver 620 a reference signal matrix $X_{N\times L}=[X_{N\times 1}^1, X_{N\times 1}^2, \ldots, X_{N\times 1}^L]$ may be formed as the receiver knows the reference signals that should have been transmitted. The singular diagonal matrix of $X_{N\times L}$ is an identity matrix ($I_{L\times L}$) and left eigenvector U and right eigenvector V are known to the receiver.

Figure 5B:
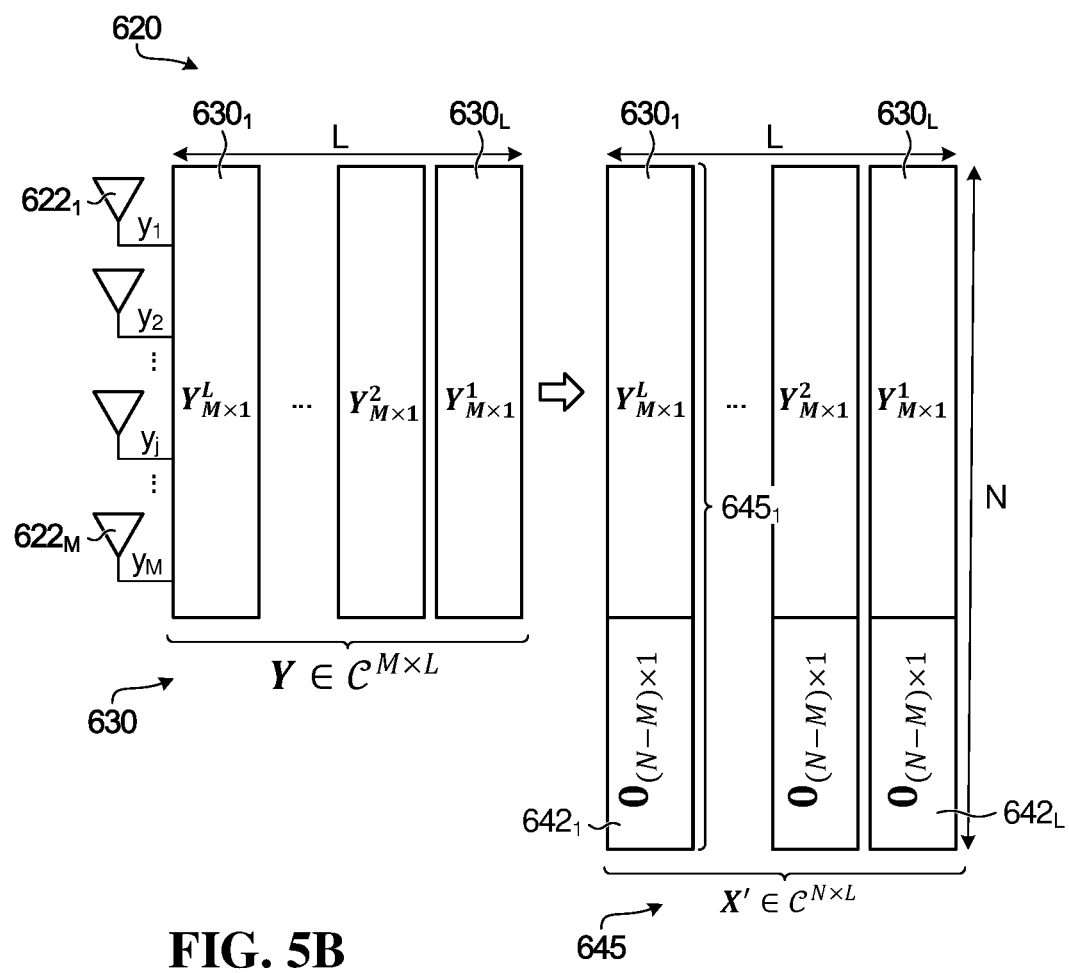
FIG. 5B is a block diagram illustrating how a received signal from the MIMO system of FIG. 5A may be augmented as part of a method to reduce calculation complexity according to embodiments of the present disclosure.

FIG. 5B illustrates a schematic diagram of a set 630 of reference signal vectors $Y_{M\times 1}^L$ received at the receiver 620, where M is the number of receiver antennas 622$_1$ to 622$_M$ over which the reference signals are received and L is the number of time intervals over which the reference signals are received. The receiver 620 knows $X_{N\times L}$ and is configured to know when, where, and in which pattern the transmitter will broadcast or multicast $X_{N\times L}$ based on the received configuration information. After the L transmission opportunities, the receiver 620 combines the received signals in a M-by-L received reference signal matrix $Y_{M\times L}$. The M receiver antennas 622$_1$ to 622$_M$ each receive an over-the-air superposition of signals transmitted from each of the transmitter antenna $X_1$ to $X_N$, at a given time interval t because on each interval, all N antennas transmitted the reference signals. At the given interval t, $Y_{M\times 1}^t$ is a M×1 vector in which each of the M vector coefficients is a received signal component from one receiver antenna 622$_1$ to 622$_M$. In FIG. 5B, the receiver 620 then appends (N−M) zeros 642$_1$ to 642$_L$ into each respective received vector $Y_{M\times 1}^t$ 630$_1$ to 630$_L$ to generate each vector $$X''_{N\times 1} = \begin{bmatrix} Y_{M\times 1}^t \\ 0_{(N-M)\times 1} \end{bmatrix},$$

for example 645$_1$, which collectively may be expressed as $$X'_{N\times L} = \begin{bmatrix} Y_{M\times L} \\ 0_{(N-M)\times L} \end{bmatrix} 645.$$

Figure 5C:
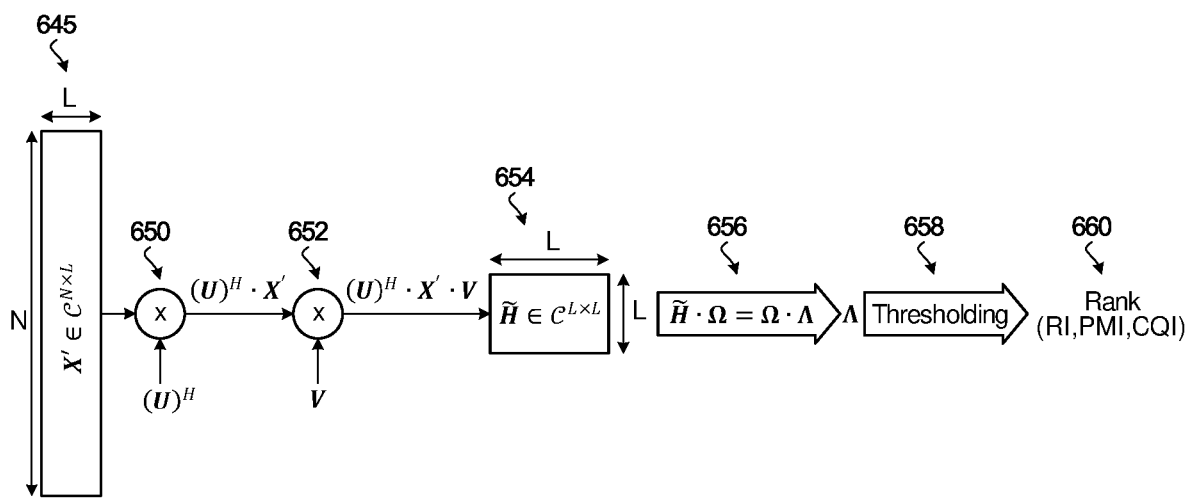
FIG. 5C is a block diagram illustrating how a received signal from the MIMO system of FIG. 5A may be processed at the receiver as part of a method to reduce calculation complexity according to embodiments of the present disclosure.

FIG. 5C illustrates a schematic diagram of $X'_{N\times L}$ 645 undergoing further processing at the receiver 620 to determine the rank of the MIMO channel. Because the receiver knows $X_{N\times L}$, the receiver 620 knows both $U_{N\times L}$ and $V_{L\times L}$ (which are the left and right eigen vectors of the reference signal matrix $X_{N\times L}$), because of $X_{N\times L}=U_{N\times L}\cdot I_{L\times L}\cdot(V_{L\times L})^H$. FIG. 5C illustrates a mathematical representation of how the receiver 620 multiplies the received matrix $X'_{N\times L}$ 645 by $(U)^H$ using a first multiplier 650. The receiver 620 then multiplies the output of multiplier 650, i.e. $(U)^H\cdot X'$, by V using a second multiplier 652, which results in the matrix $\tilde{H}=(U)^H\cdot X'\cdot V$. In a real world implementation, it is not necessary for multiplication of $(U)^H$ to occur before multiplication of V, and it is possible to implement both multiplication processes in parallel. The result of the two multiplication operations performed by multipliers 650 and 652 projects the received matrix $X'_{N\times L}$ into a L×L reduced dimension matrix ($\tilde{H}$) as compared to that of the full M×N MIMO channel matrix H. In other words, the L×L reduced dimension matrix ($\tilde{H}$) is a sub-space equivalent of the M×N MIMO channel matrix. In some embodiments, $\tilde{H}$ may not be Hermitian. Because $\tilde{H}$ may not be a Hermitian matrix, the eigenvalues of $\tilde{H}$ may be complex-valued. The receiver 620 would perform an EVD operation 656 over $\tilde{H}:\tilde{H}\cdot\Omega=\Omega\cdot\Lambda$, where $\Omega$ are eigen-vectors and $\Lambda$ is a diagonal matrix of eigenvalues. Physically speaking, for a non-Hermitian square matrix, the real part of an eigenvalue represents an amplitude of a sub-channel, while an imaginary part of the eigenvalue represents a decay period. A thresholding operation 658 may then be used to determine a number of leading eigenvalues (non-zero values). The number of leading eigenvalues is indicative of the rank. An example of a thresholding operation 658 is, if an eigenvalue, or a value proportional to the eigen value, is larger than an absolute threshold value, or a relative threshold value, then the eigenvalue may be considered a leading eigenvalue and contribute to the rank of the MIMO channel. In a particular example, a value equal to the sum of a square of the real value of a complex eigen value and a square of the imaginary value of the complex eigenvalue is compared to a threshold value. A large real part of a complex eigenvalue indicates how strong this mode is, while a large imaginary part of the complex eigenvalue indicates how durable this mode is. A complex eigenvalue with both large real and imaginary parts indicates a persistent mode. The rank may be a special measurement of a mode, without considering its decay period. The EVD process being used to find eigen values belongs to a branch of mathematics known as mode theory which pertains to determining modes. The modes in this case correspond to the channels that carry the independent data stream. However, if an eigenvalue is smaller than an absolute threshold value, or relative threshold value, then the eigenvalue may not be considered a leading eigenvalue and will not contribute to the rank of the MIMO channel.

Based on the leading eigenvalues and their eigen vectors, a receiver 620 may select a corresponding CQI, PMI, and RI, and send 660 the CQI, PMI, and RI back to the transmitter. In some embodiments, a number of tables may be predefined with feedback information that may be fed back to the transmitter. The feedback information in the tables may include values of CQI, PMI, RI, or combinations thereof. For example, the table may include different combinations of values of CQI, PMI, and RI and each combination has an associated index value. The receiver 620 can select an entry from the table having an appropriate set of CQI, PMI, and RI and then the receiver can transmit the associated index to the transmitter as feedback.

Unlike traditional singular values (which may also be referred to as real-values), the eigenvalues offer an estimation of decay over time as described above. The receiver may be aware of predefined tables associating an imaginary value of an eigenvalue to the decay period. The receiver may make a determination of the decay period for a given channel based on a comparison of the imaginary portion of the maintained leading eigen value to the predefined tables.

In some embodiments, when there is sufficient feedback bandwidth available, the receiver may transmit the leading eigenvalues and their eigen vectors to the transmitter. For example, if there are r, r being the rank, leading eigen values, the transmitter feeds back r complex eigenvalues and r L-by-1 complex vectors, which is a total of r×(L+1) complex values. The leading eigen values and their eigen vectors provide the transmitter additional information about the N-by-M MIMO channel. Because $\Omega$ are eigen-vectors and $\Lambda$ is a diagonal matrix of eigenvalues of both the sub-space ($\tilde{H}$) and full-space M×N MIMO channel matrix H, the transmitter can maximally recover the knowledge about the M×N MIMO channel from the r leading eigenvalues and L-by-1 complex vectors (leading eigen vectors) that are fed back to the transmitter.

While FIG. 5C is representative of a particular example of how the reduced dimension L×L matrix $\tilde{H}$ is determined from received reference signals transmitted over the full M×N MIMO channel, i.e. by first multiplying the received matrix $X'_{N\times L}$ by $(U)^H$ and then by multiplying that result by V, it should be understood that this projection of the received matrix $X'_{N \times L}$ into a sub-space may be performed mathematically in various different ways, for example multiplying the received matrix $X'_{N \times L}$ first by V and then the result of the first multiplication by $(U)^H$.

Figure 6A:
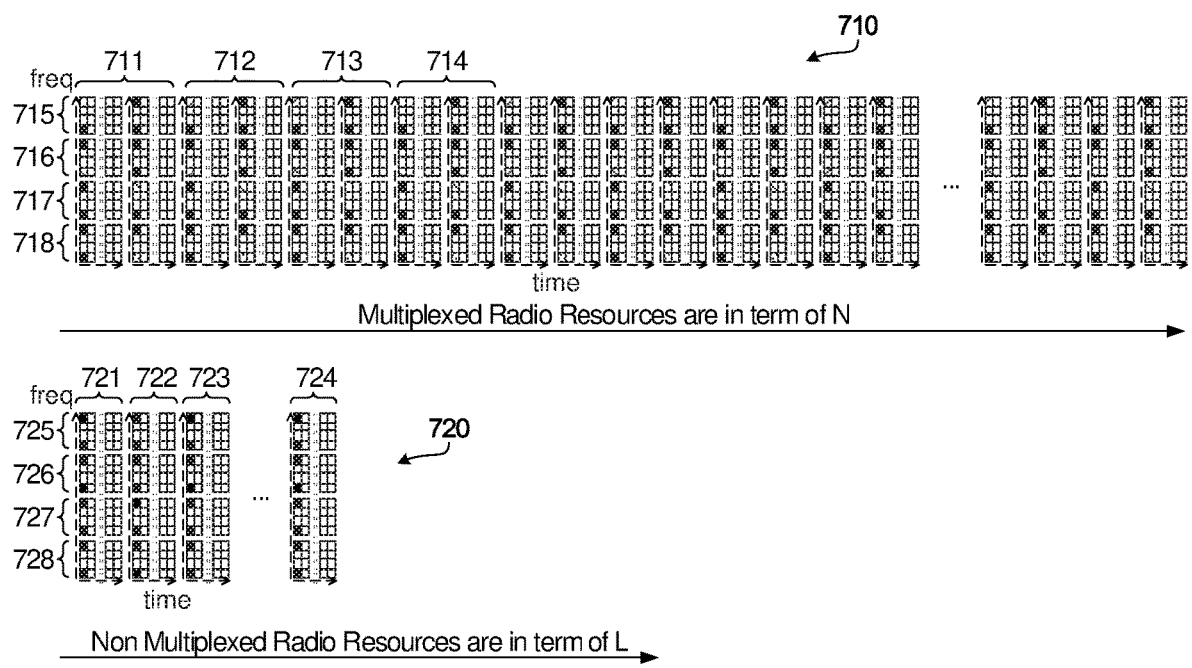
FIG. 6A is an illustration representing a comparison of radio resource needed by reference signals for estimating a MIMO channel for conventional MIMO channel estimation and MIMO channel estimation according to an aspect of the application.

FIG. 6A illustrates an example of a multiplexed radio resource 710 that includes a number of radio resources based on the number of transmitter antennas (N) for which a MIMO channel measurement may be determined. The sets of frequency resources 715, 716, 717 and 718 would be considered to be superposed as a single frequency band. The radio resource blocks that are filled in are the radio resource time frequency resources that are being used to transmit reference signals. In the example of FIG. 6A it is assumed that the reference signals are configured to be transmitted over two frequencies in a band of four possible frequencies using frequency and time multiplexing over time intervals 711, 712, 713 and 714 of the multiplexed radio resource 710. However, it is to be understood that the reference signals could be multiplexed over more frequencies and time intervals and using code multiplexing, but ultimately a number of radio resources needed is based on the number of transmitter antennas N.

FIG. 6A also shows a non-multiplexed time resource 720 in accordance with embodiments of the present disclosure that has a number of radio resources based on a subset (L) of the number of transmitter antennas of the MIMO channel in order to determine the MIMO channel rank. There are two frequency resources used for reference signal transmission, indicated by the filled in blocks in each of the time intervals 721, 722 and 723 of the multiplexed radio resource 720. All of these frequency resources are used simultaneously for reference signals during each time interval 721, 722, 723 and 724. The sets of frequency resources 725, 726, 727 and 728 would be considered to be superposed as a single frequency band.

In conventional MIMO measurement, as in 710, an amount of multiplexing radio resource in the frequency domain, time domain, code domain, or some combination thereof, is proportional to the number of transmission antennas (N). Every transmission antenna transmits a signal that includes a reference signal at an appropriate time and/or frequency of the radio resource, as described above with reference to FIG. 5A. The reference signals are multiplexed to avoid collisions on the N radio resources. In terms of performing the multiplexing, by way of a non-limiting example, a number of reference signal transmission intervals that may be used for time domain multiplexing is related to how many reference signals can be multiplexed in the frequency and/or code domains in one time interval.

In methods of the present disclosure, no multiplexing of the reference signals is used because all N transmission antennas transmit reference signals on multiple frequencies simultaneously on each of L time intervals, where L is less than N. In other words, the M×N MIMO channel may be considered as a N-in-M-out flow function rather than a combination of M×N separate end-to-end channels. The radio resource may then be expressed in terms of a maximum effective rank of the MIMO channel.

In a specific example of the proposed method, not intended to limit the scope of the disclosure, in an area served by 1536 transmitter antennas, via a single BS or multiple BS (such as shown in FIG. 2A), the network does not need to allocate a multiplexing radio resource for the 1536 transmitter antennas to transmit reference signals for each of the transmitter antennas. Instead, the network allocates a non-multiplexing radio resource for the 1536 transmitter antennas to all transmit reference signals simultaneously on multiple frequencies over L time intervals to enable the receiver to determine the maximum effective rank. Again, merely by way of example, if a receiver in the area being served by the 1536 transmitter antennas has 8 receive antennas, then the radio resource for MIMO rank detection may be assumed to be less than or equal to 8. By way of another example, after a base station is setup, the base station may determine a maximum as well as an average rank that UEs served by the base station may achieve. Despite the base station having many antenna, a maximum rank that the base station may have previously achieved is less than 16. As a result, the channel may not need to be measured to determine a maximum rank or a practical maximum rank, as the base station may use the previously determined maximum rank.

Being able to characterize the MIMO channel using MIMO rank detection in the described manner may allow the number of transmitter antennas to be significantly increased, which would not be viable using conventional MIMO channel measurement because of UE memory and computational/battery considerations for conventional MIMO channel measurement.

Figure 6B:
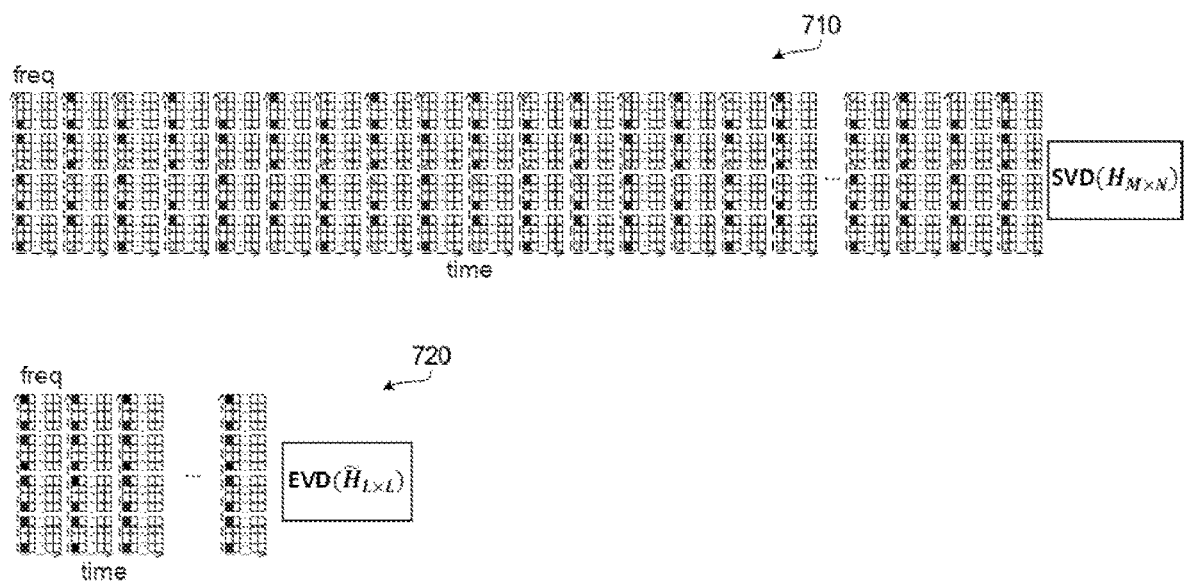
FIG. 6B is an illustration representing a comparison of timing needed by reference signals for estimating a MIMO channel for conventional MIMO channel estimation and MIMO channel estimation according to an aspect of the application.

FIG. 6B illustrates an example of a multiplexed radio resource 710 involved in conventional determining MIMO channel measurement by performing SVD to determine $H_{M \times N}$. In the conventional method, a receiver cannot compute the SVD until all reference signals have been received such that the channel matrix $H_{M \times N}$ would be considered populated because all transmitted reference signals have a corresponding received signal. Therefore, if the total amount of time needed to receive all the multiplexed reference signals occurs over a large number of time intervals, it may take a significant amount of time to be able to calculate the MIMO channel measurement because the calculation cannot even start until all of the reference signals are received.

FIG. 6B also illustrates a non-multiplexed radio resource 720 involved in determining MIMO channel measurement by performing EVD to determine the MIMO rank of $\tilde{H}_{L \times L}$. Because the L time intervals are a smaller subset of time intervals than the number of time intervals used for the conventional MIMO channel estimation, even if the MIMO rank cannot be determined until the reference signals have been transmitted by all transmit antennas over L time intervals, the number of L is less than the number of time intervals used for the conventional MIMO channel estimation, and in some cases, considerably less than the number of time intervals used for the conventional MIMO. Therefore, the MIMO rank may be determined sooner than for the conventional method. Once all the received reference signals in the form of $Y \in \mathcal{C}^{M \times L}$ are received, the rank may be determined by EVD.

In some embodiments, the described method may perform detection of the MIMO rank more often than for convention MIMO channel estimation because of the shorter duration of L time intervals, as opposed to the longer duration of N time intervals, or a number of time intervals proportional to N. Therefore, in some embodiments, when using the described method, it may be possible to determine changes occurring on the MIMO channel more frequently, or as they are occurring, than when using conventional methods.

Figure 6C:
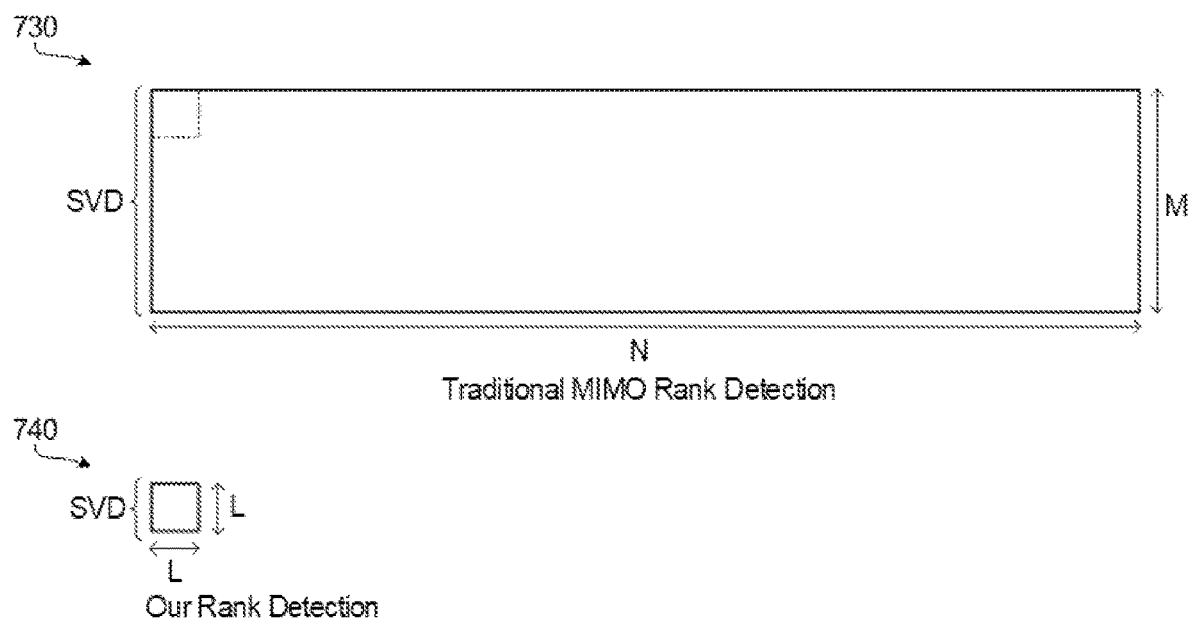
FIG. 6C is an illustration representing a comparison of complexity for a SVD operation used for conventional MIMO rank detection and an eigen value decomposition (EVD) operation used for MIMO rank detection according to an aspect of the application.

FIG. 6C illustrates an example of a M×N matrix 730 representing a multiplexed time resource involved in determining MIMO channel measurement by performing SVD to determine the rank of the matrix $H_{M \times N}$ as compared to a L×L matrix 740 representing a non-multiplexed time resource involved in determining MIMO channel measurement by performing EVD to determine the MIMO rank of $\tilde{H}_{L \times L}$. In the conventional MIMO measurement, the UE performs SVD on $H_{M \times N}$, whereas in embodiments of the present method, the UE may perform EVD on $\tilde{H}_{L \times L}$.

In traditional SVD, the rank of a matrix is based on the leading singular values, which are real-valued. In some embodiments of the present disclosure, the rank determined using EVD may be based on the leading eigenvalues being complex-valued, i.e. a+ib where a is a real value and ib is an imaginary value. Compared with the real value in SVD that represents a score, or an indication of importance, the complex-valued eigenvalue resulting from the EVD operation may be considered to represent a more physical meaning. The real part of the complex-valued eigenvalue represents a time decay factor, while the imaginary part of the complex-valued eigenvalue represents a periodicity of the decay. In other words, the complex-valued eigenvalue, may indicate the rank of the MIMO channel as well as provide an indication of a degree of change during the L consecutive intervals.

Figure 7A:
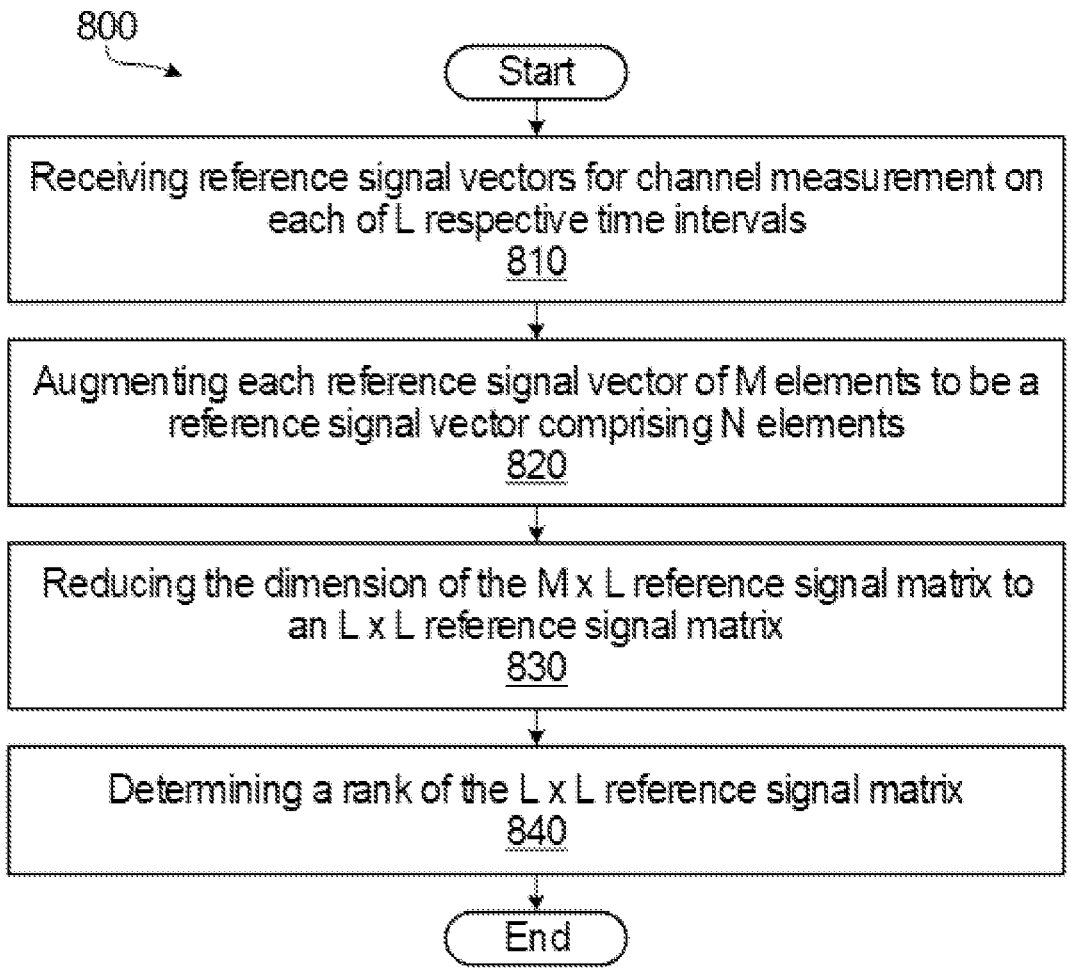
FIG. 7A is a flow chart illustrating a method performed by a receiver in order to determine a MIMO channel rank according to an aspect of the application.

A method 800 performed at a receiver will now be described with reference to FIG. 7A. The method 800 includes a step 810 of the receiver receiving reference signals for channel measurement on each of L respective time intervals. Reference signal vectors are generated based on the received reference signals. Each reference signal vector includes M elements and each of the M elements is a set of channel measurement reference signals occurring on a time frequency resource that is received from N transmit antennas on a respective receive antenna of M receive antennas. The time frequency resource may be a band of frequencies, where some of the frequencies are allocated for transmission of the reference signals for channel measurement. The non-multiplexed radio resource 720 in FIG. 6A illustrates an example of such a time frequency resource on which a set of channel measurement reference signals are transmitted.

As shown below, the receiver further generates an L×L reference signal matrix in accordance with the reference signal vectors.

Step 820 includes the receiver augmenting each reference signal vector of M elements to be a reference signal vector comprising N elements. The augmenting of the respective reference signal vector involves adding N-M zero valued elements to the M elements reference signal vector. The L augmented N element reference signal vectors may be combined to form a M×L reference signal matrix.

Step 830 includes the receiver reducing the dimension of the M×L reference signal matrix to an L×L reference signal matrix.

Step 840 involves the receiver determining a rank of the L×L reference signal matrix. Determining the rank of the L×L reference signal matrix may include determining a number of leading eigenvalues in the L×L reference signal matrix that have a value that is larger than a threshold value. The number of leading eigenvalues larger than the threshold value corresponds to the rank of the MIMO channel between the N transmit antennas and the M receive antennas.

The method may also include determining one or more of a rank indicator (RI), a pre-coding matrix indicator (PMI), a channel quality indicator (CQI) or other MIMO-channel related measurements based on the determined number of leading eigenvalues and their eigen-vectors. In some embodiments, the receiver may feedback the RI, PMI and CQI in the form of configuration information to be used by the transmitter to compensate the MIMO channel. In some embodiments, the receiver may feedback the eigen vectors to the transmitter. While RI, PMI, and CQI are results that may be determined from the SVD operation, when using the EVD operation, other parameters or measurement information may be fed back to the transmitter by the receiver.

Step 810 of receiving the reference signal vector on each of the L respective time intervals may be expressed as $Y_{M \times 1}{}^t = F(X_{N \times 1}{}^t)$, t=1, 2, 3, . . . , L where $X_{N \times 1}{}^t$ are the reference signals from the N transmit antennas in the form of a N×1 vector at time interval t, $Y_{M \times 1}{}^t$ are the reference signals received by the M receive antennas in the form of a M×1 complex vector at the time interval t, and function F(•) is a representation of the MIMO channel within the L transmission interval window.

In step 820, the augmenting each reference signal vector of M elements may be expressed as $$X''{}^t_{N \times 1} = \begin{bmatrix} Y^t_{M \times 1} \\ 0_{(N-M) \times 1} \end{bmatrix} t = 1, 2, 3, \ldots, L.$$

In step 830, reducing the dimension of the M×L reference signal matrix to an L×L reference signal matrix involves projecting the M×L reference signal received matrix into a subspace $\tilde{H} = (U)^H \cdot X' \cdot V$, which is an L×L reduced dimension matrix of a full-matrix H, where X' is the received and augmented N×L reference signal matrix, H is a matrix representing the channel between the N transmit antennas and the M receive antennas, V is a transmitter side precoding matrix, U is a receiver matrix, and the values of V and U are known.

In some embodiments, the method may further include the receiver receiving configuration information that includes information pertaining to at least one of: a maximum value of L; when a first reference signal vector is to be transmitted; and an indication of the transmitter side precoding matrix $V_{L \times L}$ and the receiver matrix $U_{N \times L}$. This configuration information may be used by the receiver, so that if it is known how many time intervals the reference signal vectors are to be received over (L), the scheduling of when to expect a first reference signal vector, and the transmitter side precoding matrix and the receiver matrix used in determining the rank, the receiver can perform channel estimation with a reduced size matrix operation. In some embodiments, the transmitter side precoding matrix and the receiver matrix are defined in tables. The transmitter may indicate which tables define the transmitter side precoding matrix and the receiver matrix and the receiver may use the appropriate matrices that corresponds to the reference signals that the transmitter chooses. In some embodiments, the transmitter may transmit the transmitter side precoding matrix and the receiver matrix to be used by the receiver.

Figure 7B:
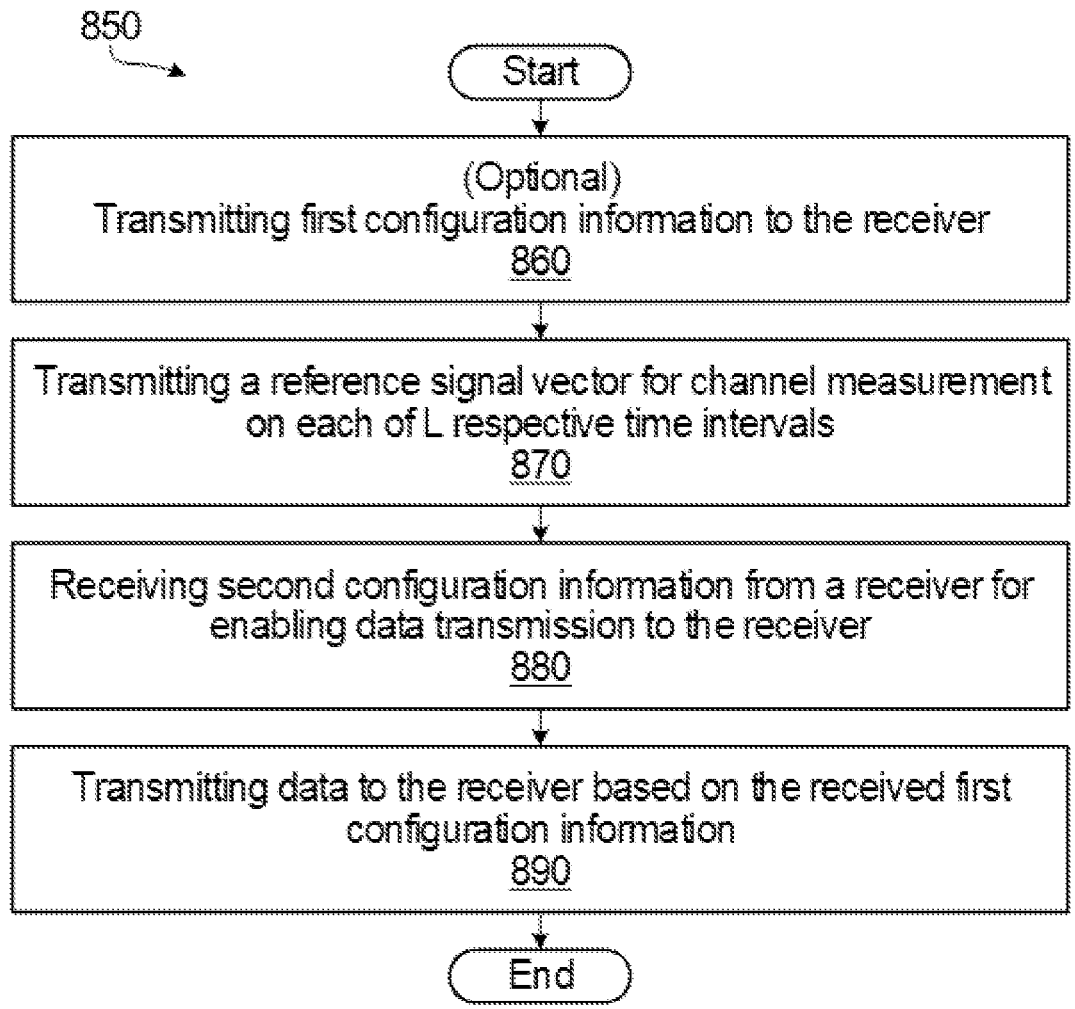
FIG. 7B is a flow chart illustrating a method performed by a transmitter according to an aspect of the application.

A method 850 performed at a transmitter will now be described with reference to FIG. 7B. The method 850 includes an optional step 860 of the transmitter transmitting first configuration information to the receiver. The first configuration information includes information pertaining to at least one of: a maximum value of L time intervals over which reference signals will be transmitted, where L is an integer value; when a first reference signal vector is to be transmitted; and an indication of the transmitter side precoding matrix $V_{L \times L}$ and the receiver matrix $U_{N \times L}$.

Step 870 of the transmitter transmitting a reference signal vector for channel measurement on each of L respective time intervals. Each reference signal vector includes N elements, where N corresponds to a number of transmit antennas, and each element is a time frequency resource transmitted on a respective transmit antenna such that each transmit antenna transmits on each of the L time intervals, where N is an integer values. In some embodiments, the reference signal vectors over the L time intervals is expressed as a reference signal $X_{N \times L}$, where $X_{N \times L} = U_{N \times L} \cdot \Sigma_{L \times L} \cdot (V_{L \times L})^H$ where the reference signal vectors are the reference signals from the N transmit antennas in the form of a N×1 complex vector at each of the L time intervals, $V_{L \times L}$ is a transmitter side precoding matrix, $U_{N \times L}$ is a is a receiver matrix, and $\Sigma_{L \times L} = I_{L \times L}$.

Step 880 includes the transmitter receiving second configuration information from a receiver for enabling data transmission to the receiver. The second configuration information includes at least one of a rank indicator (RI), a pre-coding matrix indicator (PMI), a channel quality indicator (CQI), or other MIMO-channel related measurements. The second configuration information is based upon a rank of a multiple input multiple output (MIMO) channel between the N transmitter antennas and M receiver antennas.

Step 890 includes the transmitter transmitting data to the receiver based on the received first configuration information.

The embodiments provided above in the present disclosure have great technical benefits compared to existed systems, such as LTE or NR system. LTE systems typically use the conventional MIMO channel estimation technique. Instead of being concerned with physical transmitter antennas, LTE systems are concerned with antenna ports. For DL transmissions, a reference signal that is common to all UEs in a communication cell, for example a cell-specific demodulation reference signal (DMRS), is transmitted by the BS serving the UEs. Then each UE may detect and measure the DL MIMO channel, determine a rank indicator (RI), a precoding matrix indicator (PMI) and channel quality index (CQI). The UE may then feedback RI, PMI, and CQI information instead of an entire V matrix, as was fed back in earlier versions of MIMO. This allows LTE systems to reduce payload of feedback signaling from the UE to the network and improve bandwidth efficiency. However, the complexity of performing MIMO measurements in LTE is still a function of the number of the transmitter antenna ports. To enable a larger MIMO capacity, LTE systems need an increase in a number of transmitter antennas ports. However, increasing the MIMO capacity results in the complexity of the UE needing to increase exponentially to be able to perform the MIMO channel estimation.

Figure 8:
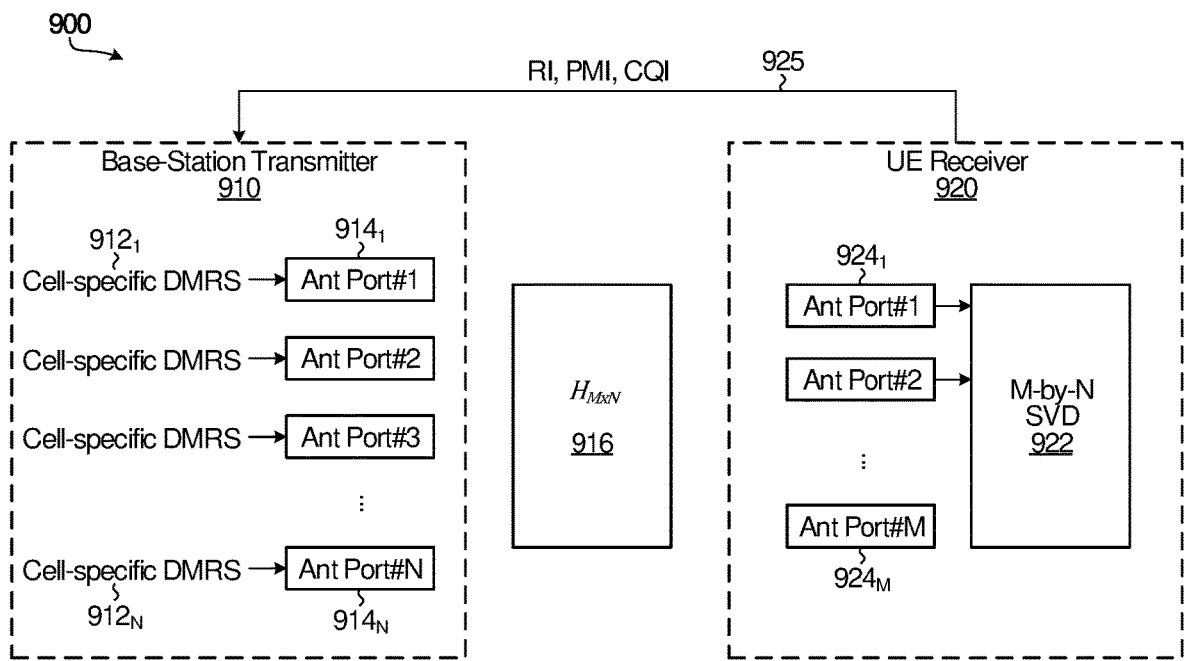
FIG. 8 is a block diagram illustrating how MIMO channel estimation and feedback of relevant information may be implemented in a LTE MIMO system.

FIG. 8 is a schematic representation of an example of an LTE system 900 including a BS 910 and UE 920. At the BS 910 there is a cell-specific DMRS ($912_1$ to $912_N$) allocated to each antenna port ($914_1$ to $914_N$). Upon transmission by the transmitter antennas associated with the BS transmit antenna ports ($914_1$ to $914_N$), the reference signals traverse the MIMO channel 916 indicated as $H_{M \times N}$. The UE 920 receives the signals from the MIMO channel 916 at the UE receive antenna ports ($924_1$ to $924_M$) and the UE 920 is configured to perform a SVD operation 922 on the M × N channel matrix. The UE 920 determines RI, PMI, and CQI and feeds back 925 the RI, PMI, and CQI information to the BS 910.

5G New Radio (NR) systems attempt to solve the problems identified in LTE systems by introducing a pre-coding matrix ($W_{init}$) in order to reduce the dimension of the number of transmitter antennas to the maximum rank.

Figure 9:
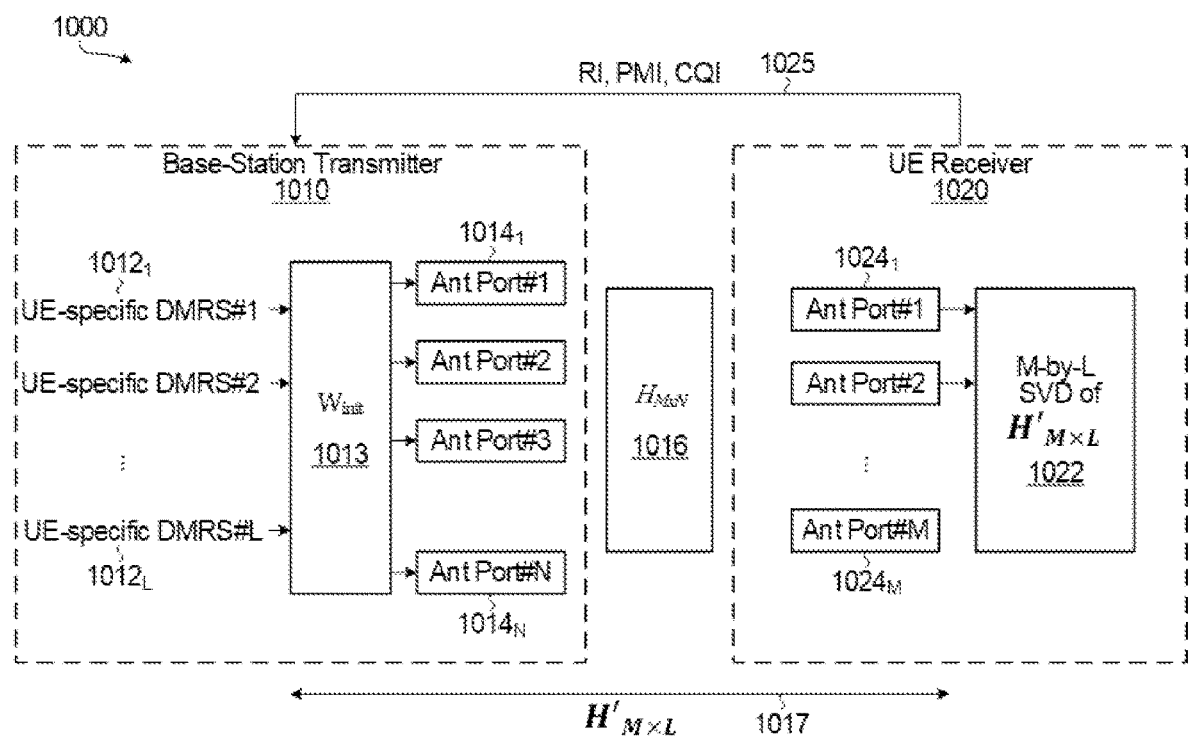
FIG. 9 is a block diagram illustrating how MIMO channel estimation and feedback of relevant information may be implemented in a 5G MIMO system.

FIG. 9 is a schematic representation of an example of an 5G system 1000 including a BS 1010 and UE 1020. At the BS 1010, UE-specific DMRS ($1012_1$ to $1012_L$) are provided to the pre-coding matrix ($W_{init}$) 1013 and outputs of pre-coding matrix 1013 are allocated to each BS transmit antenna port ($1014_1$ to $1014_N$). Upon transmission by the transmitter antennas associated with the BS transmit antenna ports ($1014_1$ to $1014_N$), the reference signals traverse the MIMO channel 1016 indicated as $H_{M \times N}$. The UE 1020 receives the signals from the MIMO channel 1016 at the UE receive antenna ports ($1024_1$ to $1024_M$) and the UE 1020 is configured to perform a SVD operation 1022 on the $H'_{M \times L}$ matrix. The $H'_{M \times L}$ matrix is shown to be representative of the MIMO channel from the UE-specific DMRS ($1012_1$ to $1012_L$) applied to the pre-coding matrix 1013 to the UE receive antenna ports ($1024_1$ to $1024_M$), as opposed to just the physical channel $H_{M \times N}$ from BS transmit antenna ports ($1014_1$ to $1014_N$) to the UE receive antenna ports ($1024_1$ to $1024_M$). The UE 1020 determines RI, PMI, and CQI and feeds back 1025 the RI, PMI, and CQI information to the BS 1010.

By using the pre-coding matrix, a 5G NR receiver performs channel estimation for matrix $H'_{M \times L}$ rather than $H_{M \times N}$, where L<N, and in some embodiments L<<N. The feedback, including values of RI, PMI, and CQI, results from the channel estimation of $H'_{M \times L}$ rather than $H_{M \times N}$. As $H'_{M \times L} = H_{M \times N} \cdot W_{init}$, if $W_{init}$ is well chosen for $H_{M \times N}$, the rank determined by the receiver is accurate for $H'_{M \times L}$. Otherwise, the receiver may not be able to accurately estimate the MIMO channel. In some implementations, $W_{init}$ may be considered to be UE specific.

In addition, 5G NR uses the concept of directional beams for some aspects of signal transmission. The pre-coding matrix $W_{init}$ may be used for a specific UE in a specific direction, which may also reduce the complexity of channel estimation. However, the use of beams does not allow for the easy use of a common pilot for all UEs being served, and as a result the pilots that are transmitted by the transmitter must be UE-specific. The use of UE specific pilots significantly increases pilot overhead for DL transmissions. Because there will likely be more UEs being used in 6G networks than in 5G networks, the use of the pre-coding matrix in combination with directional beams would cause additional pilot overhead for DL transmission and as such would not be a particularly helpful solution for future networks, such as 6G networks.

In some embodiments of the present disclosure, the amount of the matrix reduction, i.e. the size of the sub-space, is selected by the receivers. The incoming signal is represented as an M×N dimension matrix, but using proper orthogonal decomposition (POD) may be mapped onto reduced sub-space. The transmitter may set a maximum number of modes. The receiver may choose its own maximum number of modes and reduce the incoming signals. Based on this approach, a common DL MIMO channel is allowed instead of a specific DL MIMO channel for each UE.

In some embodiments, a MIMO channel may be represented by the mathematical expression $H_{M \times N} = U \cdot \Sigma \cdot V^H$. A receiver may feedback the V matrix to a transmitter that the receiver is receiving a signal from. In LTE and 5G NR, the V matrix may be too large to feedback in its entirety in practice. It has previously been proposed to feedback RI, PMI, and CQI with entries from pre-defined tables instead of an entire V matrix. Being able to feedback RI, PMI, and CQI, especially in the form of entries from a previously defined lookup table, enables a smaller amount of information and so may be considered as a kind of reduction of the control overhead. The transmitter may then derive the V matrix from the RI, PMI, and CQI.

Some embodiments of the present disclosure may feedback RI, PMI, and CQI which allow the modes to provide another represented channel. Because $\Phi=X'\cdot V\cdot\Omega$, which is the eigen vector of H, and $\Lambda$ is the eigen values of H, then $\Omega$ and $\Lambda$ may be considered an accurate representation of a high dimensional channel, i.e. a channel with a large number of MIMO channels, because $\Omega$ and $\Lambda$ are in a much reduced space.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method comprising:
receiving reference signals on each of L respective time intervals to generate reference signal vectors, each reference signal vector comprising M elements, where each of the M elements of a reference signal vector is a set of reference signals received from N transmit antennas on a respective receive antenna of M receive antennas, and where M, N and L are integer values;
generating an L×L reference signal matrix from a N×L reference signal matrix, wherein the N×L reference signal matrix comprises L augmented reference signal vectors and each of the L augmented reference signal vectors comprising N elements, the N elements being generated by adding N-M zero valued elements to the reference signal vector of M elements, wherein a dimension of the L×L reference signal matrix is less than a dimension of the N×L reference signal matrix; and
determining a rank of the L×L reference signal matrix.

2. The method of claim 1, wherein determining the rank of the L×L reference signal matrix comprises determining a number of leading eigenvalues in the L×L reference signal matrix that have a value that is larger than a threshold value, the number of leading eigenvalues corresponding to a rank of a multiple input multiple output (MIMO) channel between the N transmit antennas and M receive antennas.

3. The method of claim 2 further comprising:
determining one or more of a rank indicator (RI), a pre-coding matrix indicator (PMI), or a channel quality indicator (CQI) based on the determined number of leading eigenvalues and eigen-vectors; and
transmitting configuration information that includes one or more the of the RI, PMI or CQI.

4. The method of claim 1, wherein the reference signal vector of M elements is expressed as $Y_{M\times 1}{}^t=F(X_{N\times 1}{}^t)$, $t=1, 2, 3, \ldots, L$ where $X_{N\times 1}{}^t$ are the reference signals from the N transmit antennas in the form of a N×1 vector at time interval t, $Y_{M\times 1}{}^t$ are the reference signals received by the M receive antennas in the form of a M×1 complex vector at the time interval t, and function F(•) is a representation of a multiple input multiple output (MIMO) channel within an L transmission interval window.

5. The method of claim 4, wherein the each reference signal vector of N elements is expressed as $$X''^t_{N\times 1} = \begin{bmatrix} Y^t_{M\times 1} \\ 0_{(N-M)\times 1} \end{bmatrix} t = 1, 2, 3, \ldots, L.$$

6. The method of claim 1, wherein generating the L×L reference signal matrix comprises projecting the N×L reference signal received matrix into a subspace $\tilde{H}=(U)^H\cdot X'\cdot V$, which is an L×L reduced dimension matrix of a full-matrix H representing a multiple input multiple output (MIMO) channel between the N transmit antennas and the M receive antennas, where X' is the received and augmented N×L reference signal matrix, V is a transmitter side precoding matrix and U is a receiver matrix.

7. The method of claim 6 further comprising:
receiving information pertaining to at least one of:
a maximum value of L;
when a first reference signal vector is to be transmitted; or
an indication of the transmitter side precoding matrix $V_{L\times L}$ and the receiver matrix $U_{N\times L}$.

8. An apparatus comprising:
a processor; and
a computer-readable media having stored thereon computer executable instructions, that when executed cause the apparatus to:
receive reference signals on each of L respective time intervals to generate reference signal vectors, each reference signal vector comprising M elements, where each of the M elements of a reference signal vector is a set of reference signals received from N transmit antennas on a respective receive antenna of M receive antennas, and where M, N and L are integer values;
generate an L×L reference signal matrix from a N×L reference signal matrix, wherein the N×L reference signal matrix comprises L augmented reference signal vectors and each of the L augmented reference signal vectors comprising N elements, the N elements being generated by adding N-M zero valued elements to the reference signal vector of M elements, wherein a dimension of the L×L reference signal matrix is less than a dimension of the N×L reference signal matrix; and determine a rank of the L×L reference signal matrix.

9. The apparatus of claim 8, wherein the computer executable instructions that when executed cause the apparatus to determine the rank of the L×L reference signal matrix comprise the apparatus to determine a number of leading eigenvalues in the L×L reference signal matrix that have a value that is larger than a threshold value, the number of leading eigenvalues corresponding to a rank of a multiple input multiple output (MIMO) channel between the N transmit antennas and M receive antennas.

10. The apparatus of claim 9, wherein the computer executable instructions further cause the apparatus to:
determine one or more of a rank indicator (RI), a pre-coding matrix indicator (PMI), or a channel quality indicator (CQI) based on the determined number of leading eigen values and eigen-vectors; and
transmit configuration information or measurement information that includes one or more of the RI, PMI, or CQI.

11. The apparatus of claim 8, wherein the reference signal vector of M elements is expressed as $Y_{M\times1}^t = F(X_{N\times1}^t)$, t=1, 2, 3, ..., L where $X_{N\times1}^t$ are the reference signals from the N transmit antennas in the form of a N×1 vector at time interval t, $Y_{M\times1}^t$ are the reference signals received by the M receive antennas in the form of a M×1 complex vector at the time interval t, and function F(•) is a representation of a multiple input multiple output (MIMO) channel within an L transmission interval window.

12. The apparatus of claim 8, wherein the augmented reference signal vectors of N elements is expressed as $$X''^t_{N\times1} = \begin{bmatrix} Y^t_{M\times1} \\ 0_{(N-M)\times1} \end{bmatrix} t = 1, 2, 3, \ldots, L.$$

13. The apparatus of claim 8, wherein the computer executable instructions generating the L×L reference signal matrix comprise computer executable instructions to:
project the N×L reference signal received matrix into a subspace $\tilde{H}=(U)^H \cdot X' \cdot V$, which is an L×L reduced dimension matrix of a full-matrix H, which is a matrix representing a multiple input multiple output (MIMO) channel between the N transmit antennas and the M receive antennas where X' is the received and augmented N×L reference signal matrix, V is a transmitter side precoding matrix and U is a receiver matrix.

14. The apparatus of claim 13, wherein the computer executable instructions further cause the apparatus to:
receive second configuration information that comprises information pertaining to at least one of:
a maximum value of L;
when a first reference signal vector is to be transmitted; or
an indication of the transmitter side precoding matrix $V_{L\times L}$ and the receiver matrix $U_{N\times L}$.

15. A method comprising:
transmitting reference signals on each of L respective time intervals to a receiver for generating reference signal vectors, each reference signal vector comprising M elements, where each of the M elements of a reference signal vector is a set of reference signals received from N transmit antennas on a respective receive antenna of M receive antennas of the receiver, and where M, N and L are integer values; and receiving configuration information from the receiver, the configuration information being based upon a rank of an L×L reference signal matrix, wherein the L×L reference signal matrix is generated from a N×L reference signal matrix, wherein the N×L reference signal matrix comprises L augmented reference signal vectors and each of the L augmented reference signal vectors comprising N elements, the N elements being generated by adding N-M zero valued elements to the reference signal vector of M elements, wherein a dimension of the L×L reference signal matrix is less than a dimension of the N×L reference signal matrix.

16. The method of claim 15, wherein the configuration information comprising at least one of a rank indicator (RI), a pre-coding matrix indicator (PMI), a channel quality indicator (CQI), or other multiple input multiple output (MIMO)-channel related measurements.

17. The method of claim 15 further comprising:
transmitting data to the receiver based on the received configuration information.

18. The method of claim 15, wherein the L×L reference signal matrix is generated by projecting the N×L reference signal received matrix into a subspace $\tilde{H}=(U)^H \cdot X' \cdot V$, which is an L×L reduced dimension matrix of a full-matrix H representing a multiple input multiple output (MIMO) channel between the N transmit antennas and the M receive antennas, where X' is the received and augmented N×L reference signal matrix, V is a transmitter side precoding matrix and U is a receiver matrix.

19. The method of claim 18 further comprising:
transmitting information pertaining to at least one of:
a maximum value of L;
when a first reference signal vector is to be transmitted; or
an indication of the transmitter side precoding matrix $V_{L\times L}$ and the receiver matrix $U_{N\times L}$.

20. An apparatus comprising:
a processor; and
a computer-readable media having stored thereon computer executable instructions, that when executed cause the apparatus to:
transmit reference signals on each of L respective time intervals to a receiver for generating reference signal vectors, each reference signal vector comprising M elements, where each of the M elements of a reference signal vector is a set of reference signals received from N transmit antennas on a respective receive antenna of M receive antennas of the receiver, and where M, N and L are integer values; and
receive configuration information from the receiver, the configuration information being based upon a rank of a L×L reference signal matrix, wherein the L×L reference signal matrix is generated from a N×L reference signal matrix, wherein the N×L reference signal matrix comprises L augmented reference signal vectors and each of the L augmented reference signal vectors comprising N elements, the N elements being generated by adding N-M zero valued elements to the reference signal vector of M elements, wherein a dimension of the L×L reference signal matrix is less than a dimension of the N×L reference signal matrix.

* * * * *